(12) United States Patent
Coulombe et al.

(10) Patent No.: US 8,270,739 B2
(45) Date of Patent: Sep. 18, 2012

(54) SYSTEM AND METHOD FOR QUALITY-AWARE SELECTION OF PARAMETERS IN TRANSCODING OF DIGITAL IMAGES

(75) Inventors: Stephane Coulombe, Brossard (CA);
Steven Pigeon, Blainville (CA);
Jean-Francois Franche, Mascouche (CA)

(73) Assignee: Ecole de Technologie Superieure, Montreal (CA)

( * ) Notice: Subject to any disclaimer, the term of this patent is extended or adjusted under 35 U.S.C. 154(b) by 1076 days.

(21) Appl. No.: 12/164,836

(22) Filed: Jun. 30, 2008

(65) Prior Publication Data

US 2009/0141990 A1 Jun. 4, 2009

Related U.S. Application Data

(60) Provisional application No. 60/991,956, filed on Dec. 3, 2007.

(51) Int. Cl.
*G06K 9/36* (2006.01)
*G06F 15/177* (2006.01)

(52) U.S. Cl. ........ 382/239; 715/734; 382/232; 382/233; 382/235; 382/240

(58) Field of Classification Search .................... 382/23, 382/235, 240; 375/240.16
See application file for complete search history.

(56) References Cited

U.S. PATENT DOCUMENTS

| | | | |
|---|---|---|---|
| 6,154,572 A | 11/2000 | Chaddha | |
| 6,233,359 B1 | 5/2001 | Ratnakar | |
| 6,421,467 B1 | 7/2002 | Mitra | |
| 6,490,320 B1 | 12/2002 | Vetro et al. | |
| 6,563,517 B1 * | 5/2003 | Bhagwat et al. | 715/735 |
| 6,990,146 B2 | 1/2006 | Chen | |
| 6,992,686 B2 | 1/2006 | Nagarajan | |
| 7,142,601 B2 * | 11/2006 | Kong et al. | 375/240.16 |
| 7,177,356 B2 | 2/2007 | Moni et al. | |
| 7,245,842 B2 | 7/2007 | Hino | |
| 7,440,626 B2 | 10/2008 | Kong et al. | |
| 7,583,844 B2 * | 9/2009 | Fehmi et al. | 382/232 |
| 7,805,292 B2 | 9/2010 | Huo et al. | |
| 8,073,275 B2 * | 12/2011 | Shatz et al. | 382/239 |
| 2003/0161541 A1 | 8/2003 | Ridge | |
| 2003/0227977 A1 | 12/2003 | Henocq | |

(Continued)

FOREIGN PATENT DOCUMENTS

EP 1615447 A1 1/2006

(Continued)

OTHER PUBLICATIONS

Ismail Avcibas, Bulent Sankur and Khalid Sayood, Statistical evaluation of image quality measures. Journal of Electronic Imaging, vol. 11, No. 2, pp. 206-223, Apr. 2002.*

(Continued)

*Primary Examiner* — Chan S Park
*Assistant Examiner* — Ha Le
(74) *Attorney, Agent, or Firm* — IP-MEX Inc.; Victoria Donnelly

(57) ABSTRACT

Several quality-aware transcoding systems and methods are described, in which the impact of both quality factor (QF) and scaling parameter choices on the quality of transcoded images are considered in combination. A basic transcoding system is enhanced by the addition of a quality prediction look-up table, and a method of generating such a table is also shown.

30 Claims, 15 Drawing Sheets

U.S. PATENT DOCUMENTS

| | | | |
|---|---|---|---|
| 2004/0220891 | A1 | 11/2004 | Dodgson |
| 2007/0160133 | A1* | 7/2007 | Bao et al. .................. 375/240.1 |
| 2007/0239634 | A1 | 10/2007 | Tian |
| 2008/0123741 | A1 | 5/2008 | Li et al. |
| 2008/0279275 | A1* | 11/2008 | Suzuki ..................... 375/240.03 |
| 2009/0016434 | A1* | 1/2009 | Amonou et al. ......... 375/240.12 |
| 2009/0141990 | A1 | 6/2009 | Pigeon et al. |
| 2009/0141992 | A1 | 6/2009 | Coulombe et al. |
| 2010/0150459 | A1 | 6/2010 | Coulombe et al. |

FOREIGN PATENT DOCUMENTS

| | | |
|---|---|---|
| WO | 0169936 A2 | 9/2001 |
| WO | WO 2006/085301 | 8/2006 |
| WO | WO 2006/085301 A2 * | 8/2006 |
| WO | WO 2006085301 | 8/2006 |
| WO | WO2006/094000 | 9/2006 |
| WO | WO 2006/097144 | 9/2006 |
| WO | WO2006110975 | 10/2006 |
| WO | 2009055899 A1 | 5/2009 |

OTHER PUBLICATIONS

"The independent JPEG Group" ftp.uu.net/graphics/jpeg/jpegsrc. v6b.tar.gz, Aug. 3, 2007.

Multimedia Messaging Service, Media formats and codecs 3GPP TS 26.140, V 7.1.0, http://www.3gpp.org/ftp/specs/html-info/26140. htm, Jun. 2007.

Pigeon, S., Coulombe, S. "Very Low Cost Algorithms for Predicting the File Size of JPEG Images Subject to Changes of Quality Factor and Scaling" Data Compression Conference p. 528, 2008.

Pigeon, S., Coulombe, S. "Computationally Efficient Algorithms for Predicting the File Size of JPEG Images Subject to Changes of Quality Factor and Scaling" Proceedings of the 24th Queen's Biennial Symposium on Communications, Queen's University, Kingston, Canada, 2008.

Wang, Z., Bovic, A., Rahim, H., Sheikh, Simoncelli, E. " Image Quality Assessment: From Error Visibility to Structural Similarity" IEEE Transactions on Image Processing, vol. 13, No. 4, pp. 600-612, Apr. 2004.

JPEG—Wikipedia, the free encyclopedia, http://en.wikipedia.org/wiki/JPEG, Aug. 5, 2007.

S. Chandra and C.S. Ellis "JPEG Compression Metric as a Quality Aware Image Transcoding" Proceedings of USITS'99: The 2nd USENIX Symposium on Internet Technologies and Systems, Boulder, Colorado, USA, Oct. 11-14, 1999.

S. Coulombe and G. Grassel, "Multimedia adaptation for the multimedia messaging service," IEEE Communications Magazine, vol. 42, No. 7, pp. 120-126, Jul. 2004.

Z. Lei and N.D. Georganas, "Accurate bit allocation and rate control for DCT domain video transcoding," in IEEE CCECE 2002. Canadian Conference on Electrical and Computer Engineering, vol. 2, pp. 968-973, 2002.

A. Vetro, C. Christopoulos, and H. Sun, "Video transcoding architectures and techniques: an oveiview," IEEE Signal Processing Magazine, vol. 20, No. 2, pp. 18-29, Mar. 2003.

J. Ridge, "Efficient transform-domain size and resolution reduction of images," Signal Processing: Image Communication, vol. 18, No. 8, pp. 621-639, Sep. 2003.

The independent JPEG Group's JPEG Software, release 6b, Documentation Roadmap and associated software, published on the Internet at ftp.uu.net (Internet address 192.48.96.9) on Mar. 27, 1998.

S. Grgi'C, M. Grgi'C, and M. Mrak, "Reliability of objective picture quality measures," Journal of Electrical Engineering, vol. 55, No. 1-2, pp. 3-10, 2004.

OMA Multimedia Messaging Service, Architecture Overview, Approved Version 1.2 Mar. 1, 2005, published by Open Mobile Alliance, available from http://www.openmobilealliance.org/release_program/mms_v1_2.html.

3GPP in 3GPP TS 23.140 V6.14.0 (Nov. 6, 2006) Technical Specification 3rd Generation Partnership Project; Technical Specification Group Core Network and Terminals; Multimedia Messaging Service (MMS); Functional description; Stage 2 (Release 6) at http://www.3gpp.org/ftp/Specs/html-info/23140.htm (document http://www.3gpp.org/FTP/Specs/archive/23_series/23.140/23140-6e0.zip).

International Search Report and Written Opinion rendered by CIPO, dated Oct. 6, 2008.

Reed E C et al, "Optimal multidimensional bit-rate control for video communication", IEEE Transactions on Image Processing, vol. 11, No. 8, Aug. 1, 2002, pp. 873-885.

Ta-Peng Tan et al, "On the methods and application of arbitrarily downsizing video transcoding", Multimedia and Expo, 2002. ICME '02. Proceedings. 2002 IEEE International Conference on Lausanne, Switzerland Aug. 26-29, 2002, Piscataway, NJ, USA. IEEE US vol. 1, Aug. 26, 2002, pp. 609-612.

Haiyan Shu et al, "Frame Size Selection in Video Downsizing Transcoding Application", Conference Proceedings/IEEE International Symposium on Circuits and Systems (ISCAS): May 23-26, 2005, May 23, 2005, pp. 896-899.

Haiwei Sun et al, "Fast motion vector and bitrate re-estimation for arbitrary downsizing video transcoding", Proceedings of the 2003 International Symposium on Circuits and Systems (ISCAS), 2003. vol. 2, Jan. 1, 2003, pp. II-856.

Shu H et al, "The Realization of Arbitrary Downsizing Video Transcoding", IEEE Transaction on Circuits and Systems for Video Technology, IEEE Service Center, vol. 16, No. 4, Apr. 1, 2006, pp. 540-546.

Bruckstein A M et al, "Down-scaling for better transform compression", IEEE Transactions on Image Processing, vol. 12, No. 9, Sep. 1, 2003, pp. 1132-1144.

Wang D et al, "Towards Optimal Rate Control: A Study of the Impact of Spatial Resolution, Frame Rate, and Quantization on Subjective Video Quality and Bit Rate", Visual Communications and Image Processing, 2003, In Proceedings of SPIE, vol. 5150, Jul. 8, 2003, pp. 198-209.

Herman et al, "Nonlinearity Modelling of QoE for Video Streaming over Wireless and Mobile Network", Intelligent Systems, Modelling and Simulation (ISMS), 2011 Second International Conference on, IEEE, Jan. 25, 2011, pp. 313-317.

Wang, Y. et al: "Utility-Based Video Adaptation for Universal Multimedia Access (UMA) and Content-Based Utility Function Prediction for Real-Time Video Transcoding", IEEE Transactions on Multimedia, IEEE Service Center, Piscataway, NJ, U.S. vol. 9, No. 2, Feb. 1, 2007, pp. 213-220, XP011346385, ISSN: 1520-9210, DOI: 10.1109/TMM.2006.886253.

Coulombe S. et al: "Low-Complexity Transcoding of JPEG Images With Near-Optimal Quality Using a Predictive Quality Factor and Scaling Parameters", IEEE Transactions on Image Processing, IEEE Service Center, Piscataway, NJ, US. vol. 18, No. 3, Mar. 1, 2010, pp. 712-721, XP011297927, ISSN: 1057-7149.

\* cited by examiner

SYSTEM AND METHOD FOR QUALITY-AWARE SELECTION OF PARAMETERS IN TRANSCODING OF DIGITAL IMAGES

RELATED APPLICATIONS

The present application claims benefit from the US provisional application to Stéphane Coulombe Ser. No. 60/991,956 filed on Dec. 3, 2007 entitled "Quality-Aware Selection of Quality Factor and Scaling Parameters in JPEG Image Transcoding", which is incorporated herein by reference.

FIELD OF THE INVENTION

The present invention relates generally to image transcoding and more specifically to the transcoding of images contained in a multimedia messaging service (MMS) message.

BACKGROUND OF THE INVENTION

The multimedia messaging service (MMS) as described, e.g., in the OMA Multimedia Messaging Service specification, Approved Version 1.2 May 2005, Open Mobile Alliance, OMA-ERP-MMS-V1_2-200504295-A.zip, which is available at the following URL http://www.openmobilealliance-.org/Technical/release_program/mms_v1_2.aspx, provides methods for the peer-to-peer and server-to-client transmission of various types of data including text, audio, still images, and moving images, primarily over wireless networks.

While the MMS provides standard methods for encapsulating such data, the type of data may be coded in any of a large number of standard formats such as plain text, 3GP video and audio/speech, SP-MIDI for synthetic audio, JPEG still images (details on any one of those refer to Multimedia Messaging Service, Media formats and codecs, 3GPP TS 26.140, V7.1.0 (2007-06), available at the following URL http://www.3gpp.org/ftp/Specs/html-info/26140.htm). Still images are frequently coded in the JPEG format for which a software library has been written by "The independent jpeg group" and published at ftp.uu.net/graphics/jpeg/jpegsrc.v6b.tar.gz.

FIG. 1 illustrates one example of a MMS system architecture 100, including an Originating Node 102, a Service Delivery Platform 104, a Destination Node 106, and an Adaptation Engine 108. The Originating Node 102 is able to communicate with the Service Delivery Platform 104 over a Network "A" 110. Similarly the Destination Node 106 is able to communicate with the Service Delivery Platform 104 over a Network "B" 112. The Networks "A" and "B" are merely examples, shown to illustrate a possible set of connectivities, and many other configurations are also possible. For example, the Originating and Destination Nodes (102 and 106) may be able to communicate with the Service Delivery Platform 104 over a single network; the Originating Node 102 may be directly connected to the Service Delivery Platform 104 without an intervening network, etc.

The Adaptation Engine 108 may be directly connected with the Service Delivery Platform 104 over a link 114 as shown in FIG. 1, or alternatively may be connected to it through a network, or may be embedded in the Service Delivery Platform 104.

In a trivial case, the Originating Node 102 may send a (multimedia) message that is destined for the Destination Node 106. The message is forwarded through the Network "A" 110 to the Service Delivery Platform 104 from which the message is sent to the Destination Node 106 via the Network "B" 112. The Originating and Destination Nodes (102 and 106) may for instance be wireless devices, the Networks "A" and "B" (110 and 112) may in this case be wireless networks, and the Service Delivery Platform 104 may provide the multimedia message forwarding service.

In another instance, the Originating Node 102 may be a server of a content provider, connected to the Service Delivery Platform 104 through a data network, i.e. the Network "A" 110 may be the internet, while the Network "B" 112 may be a wireless network serving the Destination Node 106 which may be a wireless device.

An overview of server-side adaptation for the Multimedia Messaging Service (MMS) is given in a paper "Multimedia Adaptation for the Multimedia Messaging Service" by Stephane Coulombe and Guido Grassel, IEEE Communications Magazine, vol. 42, no. 7, pp. 120-126, July 2004.

In the case of images in particular, the message sent by the Originating Node 102 may include an image, specifically a JPEG encoded image. The capabilities of the Destination Node 106 may not include the ability to display the image in its original form, for example because the height or width of the image in terms of the number of pixels, that is the resolution of the image, exceeds the size or resolution of the display device in the Destination Node 106. In order for the Destination Node 106 to receive and display it, the image may be modified in an Image Transcoder 116 in the Adaptation Engine 108 before being delivered to the Destination Node 106. The modification of the image by the Image Transcoder 116 typically may include scaling, i.e. change the image resolution, and compression.

Image compression is commonly done to reduce the file size of the image for reasons of storage or transmission economy, or to meet file size limits or bit rate limits imposed by network requirements. The receiving device in MMS also has a memory limitation leading to a file size limit. The JPEG standard provides a commonly used method for image compression. As is well known, JPEG compression is "lossy", that is a compressed image may not contain 100% of the digital information contained in the original image. The loss of information can be controlled by setting a "Quality Factor" QF during the compression. A lower QF is equivalent to higher compression and generally leads to a smaller file size. Conversely, a higher QF leads to a larger file size, and generally higher perceived "quality" of the image.

Changing an image's resolution, or scaling, to meet a terminal's capabilities is a problem with well-known solutions. However, optimizing image quality against file size constraints remains a challenge, as there are no well-established relationships between the quality factor QF, perceived quality, and the compressed file size. Using scaling as an additional means of achieving file size reduction, rather than merely resolution adaptation, makes the problem all the more challenging.

The problem of file size reduction for visual content has been studied extensively. In "Accurate bit allocation and rate control for DCT domain video transcoding" by Zhijun Lei and N.D. Georganas, in IEEE CCECE 2002. Canadian Conference on Electrical and Computer Engineering, 2002, vol. 2, pp. 968-973, it is shown that bit rate reduction can be achieved through adaptation of quantization parameters, rather than through scaling. This makes sense in the context of low bit rate video, where resolution is often limited to a number of predefined formats. In "Efficient transform-domain size and resolution reduction of images" by Justin Ridge, in Signal Processing: Image Communication, vol. 18, no. 8, pp. 621-639, September 2003, a technique is described for scaling and then reducing the file size of JPEG images. But this technique does not consider estimating scaling and quality reduction in combination. A method of reducing the size of an existing JPEG file is described in the U.S. Pat. No. 6,233,359 entitled "File size bounded JPEG transcoder" May 2001, by Viresh Ratnakar and Victor Ivashin. However, while reducing the quality and bit rate of an image, this method does not include scaling of the image.

Methods to estimate the compressed file size of a JPEG image that is subject to simultaneous changes in scaling and in QF have been reported in a brief note by Steven Pigeon and Stephane Coulombe, entitled "Very Low Cost Algorithms for Predicting the File Size of JPEG Images Subject to Changes of Quality Factor and Scaling", Data Compression Conference (DCC 2008), p. 538, 2008, and fully described in "Computationally efficient algorithms for predicting the file size of JPEG images subject to changes of quality factor and scaling" in Proceedings of the 24th Queen's Biennial Symposium on Communications, Queen's University, Kingston, Canada, 2008 (the "Kingston" paper), and in the PCT patent application to Steven Pigeon entitled "System and Method for Predicting the File Size of Images Subject to Transformation by Scaling and Change of Quality-Controlling Parameters" serial number PCT/CA2007/001974 filed Nov. 2, 2007, which is incorporated herein by reference.

In spite of recent advancement in the area of image transcoding, there remains a requirement for developing an improved transcoding method that takes scaling, compressed file size limitations, as well as image quality into account.

SUMMARY OF THE INVENTION

It is therefore an object of the invention to provide a method and system for scaling an image, which would avoid or mitigate the shortcomings of the prior art.

According to one aspect of the invention, there is provided an image transcoding system for transcoding an input image into an output image for a terminal having file size and image size constraints, the system comprising:
  a computer, having a computer readable storage medium having computer executable instructions stored thereon, which when executed by the computer, provide the following:
  an image feature extraction module for determining dimensions, a file size, and an encoding quality factor QF(I) of the input image;
  a transcoding module for transcoding the input image into the output image with transcoding parameters including a transcoder scaling factor zT and an output encoding quality factor QFT;
  a quality determination block for determining a quality metric of the transcoding;
  a quality and file size prediction module for determining a relative output file size of the output image as a function of the transcoding parameters; and
  a quality-aware parameter selection module for determining the optimal transcoding parameters to satisfy a maximum relative file size, and producing an optimal quality metric.

The transcoding module includes:
  a decompression module for decompressing the input image;
  a scaling module for scaling the decompressed input image with the transcoder scaling factor zT; and
  a compression module for compressing the decompressed and scaled input image with the output encoding quality factor QFT.

The quality-aware parameter selection module includes:
  computational means for selecting a feasible combination of the scaling factor zT less than a maximum scaling factor determined from the dimensions of the input image and the terminal constraints, and the quality factor QT, which feasible combination leads to a relative output file size prediction that respects the maximum relative file size; and
  computational means for iteratively selecting a distinct value pair (zT,QFT) until the quality metric is optimal.

The quality determination block includes a quality assessment module for explicitly computing the quality metric, the quality assessment module comprising:
  a decompression(R) module for decompressing the output image;
  a scaling(zR) module for scaling the decompressed output image with a re-scaling factor zR;
  a decompression(V) module for decompressing the input image;
  a scaling(zV) module for scaling the decompressed input image with a viewing scaling factor zV; and
  a quality computation module for computing the quality metric from the decompressed and scaled output image and the decompressed and scaled input image.

Preferably, the quality metric is based on the Peak Signal to Noise Ratio (PSNR) measure of the output image compared with the input image. Alternatively, the quality metric may be based on the Maximum Difference (MD) measure of the output image compared with the input image. Beneficially, the input image and the output image are JPEG images.

The quality determination block includes a quality prediction table for looking up a predicted quality metric as the quality metric, the quality prediction table comprising a plurality of table entries indicative of the predicted quality metric indexed by:
  an input quality factor QF_in which is equal to the encoding quality factor QF(I) of the input image;
  a viewing scaling factor zV which may be set equal to the transcoder scaling factor zT or another value as appropriate for the viewing condition of the output image;
  the transcoder quality factor QFT; and
  the transcoder scaling factor zT.

The quality prediction table comprises a plurality of table entries indicative of the predicted quality metric, which is further indexed by a viewing scaling factor zV, which is set to be equal to value in a range between the transcoder scaling factor zT and the maximum scaling factor.

The quality determination block further includes a quality assessment module for explicitly computing a computed quality metric, the quality assessment module including:
  a decompression(R) module for decompressing the output image;
  a re-scaling(zR) module for scaling the decompressed output image with a re-scaling factor zR;
  a decompression(V) module for decompressing the input image;
  a scaling(zV) module for scaling the decompressed input image with the scaling factor zV; and
  a quality computation module for computing the computed quality metric from the decompressed and scaled output image and the decompressed and scaled input image.

The quality-aware parameter selection module further comprises:
  storage means for a feasible set "F" of the feasible combinations of (zT,QFT);

computational means for sorting entries of the feasible set "F" according to the predicted quality metric obtained from the quality prediction table;

computational means for creating a promising subset of the feasible set "F";

computational means for iteratively selecting a distinct value pair (zT,QFT) from the promising subset and computing a corresponding quality metric with the quality assessment module until the quality metric is optimal.

According to another aspect of the invention, there is provided a method for quality-aware transcoding of an input image into an output image for display on a terminal having device file size and image size constraints, the method including steps of:

(a) getting the constraints of the terminal;
(b) getting the input image;
(c) extracting features of the input image including dimensions and a file size of the input image;
(d) determining a maximum scaling factor z_max from the image size and dimensions of the input image;
(e) determining a maximum relative file size from the device file size and a file size of the input image;
(f) selecting feasible transcoding parameter value pairs, each value pair including a transcoder scaling factor zT not exceeding the maximum scaling factor z_max, and an output encoding quality factor QFT selected so that a predicted relative output file size does not exceed the maximum relative file size;
(g) transcoding the input image into the output image with a selected one of the feasible transcoding parameter value pairs;
(h) determining a quality metric of the transcoding;
(j) saving the output image associated with the best quality metric as a best image;
(k) choosing another one of the feasible transcoding parameter value pairs and repeating the steps (g) to (j) until a best quality metric is found; and
(l) outputting the best image.

The step (c) includes extracting an encoding quality factor QF(I) of the input image, and the step (f) includes predicting the relative output file size as a function of the encoding quality factor QF(I), the transcoder scaling factor zT, and the output encoding quality factor QFT.

The step (g) includes skipping to the step (k) in the event the actual relative file size of the output image after transcoding exceeds the maximum relative file size.

The step (h) includes:
(i) decompressing the input image and scaling it with a viewing scaling factor zV to yield a first intermediate image, where the viewing scaling factor zV between zT and unity is chosen based on anticipated viewing conditions of the output image;
(ii) decompressing the output image and scaling it with a re-scaling factor zR to yield a second intermediate image, where zR is calculated as zR=zV/zT; and
(iii) computing the quality metric as the Peak Signal to Noise Ratio (PSNR) between the second and the first intermediate images.

Beneficially, the step (h) includes reading the quality metric from a multi-dimensional quality prediction table indexed by two or more of the following indices:
(index 1) the input quality factor QF(I) of the input image;
(index 2) a viewing scaling factor zV between zT and unity, chosen based on anticipated viewing conditions of the output image;
(index 3) the output encoding quality factor QFT; and
(index 4) the transcoder scaling factor zT. Conveniently, the step (h) comprises interpolating between tables entries for at least one of the indices.

The step (f) includes creating a feasible set "F" of feasible transcoding parameter value pairs and truncating the set such that only a definable number C_max of transcoding parameter value pairs predicted to yield the highest quality metric remain in the set and remain available for selection, wherein the predicted quality metric is obtained by reading it from a multi-dimensional quality prediction table indexed by two or more of the following indices:
(index 1) the input quality factor QF(I) of the input image;
(index 2) a viewing scaling factor zV between zT and unity, chosen based on anticipated viewing conditions of the output image;
(index 3) the output encoding quality factor QFT; and
(index 4) the transcoder scaling factor zT,
and wherein the step (h) includes:
(i) decompressing the input image and scaling it with a viewing scaling factor zV to yield a first intermediate image, where the viewing scaling factor zV between zT and unity is chosen based on anticipated viewing conditions of the output image;
(ii) decompressing the output image and scaling it with a re-scaling factor zR to yield a second intermediate image, where zR is calculated as zR=zV/zT; and
(iii) computing the quality metric as the Peak Signal to Noise Ratio (PSNR) between the second and the first intermediate images.

If required, the step (f) comprises interpolating between tables entries for at least one of the indices.

A computer readable medium and an article of manufacture, comprising computer code instructions stored thereon, which, when executed by a computer, perform the steps of the methods recited above, are also provided.

According to yet one more aspect of the invention, there is provided a method for quality-aware transcoding of an input image into an output image for display on a display device, comprising steps of:
(a) getting device constraints of the display device;
(b) getting the input image;
(c) extracting features of the input image;
(d) predicting a file size of the output image from the device constraints and the extracted features;
(e) selecting a set of feasible transcoding parameters to meet the device constraints;
(f) transcoding the input image into the output image with the selected feasible transcoding parameters;
(g) determining a quality metric of the output image;
(h) repeating the steps (e) to (g) until a highest quality metric is found.

In the method described above, the step (g) includes determining the quality metric based on a computation of the Peak Signal to Noise Ratio (PSNR) of the output image compared with the input image.

Preferably, the step (g) includes predicting the quality metric by look-up in a quality prediction table. If required, the step (g) comprises interpolating between tables entries.

The step (e) includes truncating the set of feasible transcoding parameters to a smaller set by keeping only the feasible transcoding parameters predicted to result in a high quality metric. The step (e) includes using a quality prediction table to look up the predicted quality metric, indexed by the feasible transcoding parameters.

Preferably, the input and output images processed by the system and methods described above, are JPEG images. It is contemplated that methods and system of the embodiments of the invention are also applicable to digital images encoded with other formats, for example GIF (Graphics Interchange Format) and PNG (Portable Network Graphics) when they are used in a lossy compression mode.

Thus, an improved system and method for transcoding a digital image have been provided.

BRIEF DESCRIPTION OF THE DRAWINGS

Embodiments of the invention will now be described, by way of example, with reference to the accompanying drawings, in which.

DETAILED DESCRIPTION OF THE EMBODIMENTS OF THE INVENTION

Figure 1:
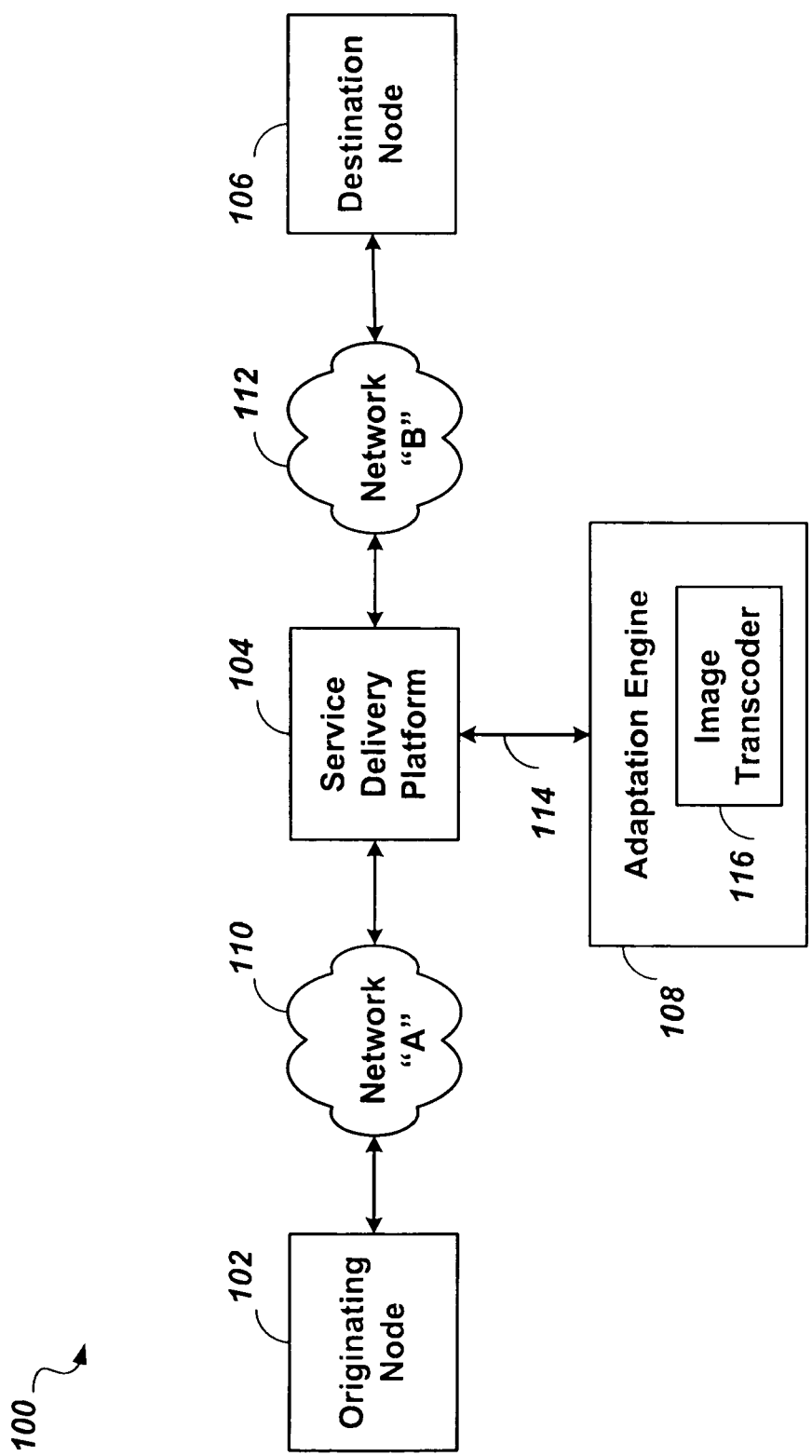
FIG. 1 illustrates an example of an MMS system architecture 100 of the prior art.

It is an objective of the embodiments of the invention to provide a quality-aware image transcoder for scaling an image to meet the constraints of a display device in terms of resolution or image size, and file size while at the same time maximizing the user experience, or objective quality of the transcoded image.

In a first embodiment, a transcoder system is described which makes use of a predictive table (Table 1 below) that is based on results of transcoding a large number of images. Further details of the predictive table, and methods by which such a table may generated can be found in the above mentioned paper by Steven Pigeon and Stephane Coulombe, entitled "Computationally efficient algorithms for predicting the file size of JPEG images subject to changes of quality factor and scaling".

The predictive table may serve as a three-dimensional look-up table for estimating with a certain amount of statistical confidence, the file size of a transcoded image as a function of three quantized variables: the input Quality Factor of the image before transcoding (QF_in); the scaling factor ("z"); and the output Quality Factor to be used in compressing the scaled image (QF_out).

For convenience of the reader, an example of a two-dimensional slice of the predictive table is reproduced here from the above mentioned paper.

TABLE 1

| | Relative File Size Prediction scaling z | | | | | | | | | |
|---|---|---|---|---|---|---|---|---|---|---|
| QF_out | 10% | 20% | 30% | 40% | 50% | 60% | 70% | 80% | 90% | 100% |
| 10 | 0.03 | 0.04 | 0.05 | 0.07 | 0.08 | 0.10 | 0.12 | 0.15 | 0.17 | 0.20 |
| 20 | 0.03 | 0.05 | 0.07 | 0.09 | 0.12 | 0.15 | 0.19 | 0.22 | 0.26 | 0.32 |
| 30 | 0.04 | 0.05 | 0.08 | 0.11 | 0.15 | 0.19 | 0.24 | 0.29 | 0.34 | 0.41 |
| 40 | 0.04 | 0.06 | 0.09 | 0.13 | 0.17 | 0.22 | 0.28 | 0.34 | 0.40 | 0.50 |
| 50 | 0.04 | 0.06 | 0.10 | 0.14 | 0.19 | 0.25 | 0.32 | 0.39 | 0.46 | 0.54 |
| 60 | 0.04 | 0.07 | 0.11 | 0.16 | 0.22 | 0.28 | 0.36 | 0.44 | 0.53 | 0.71 |
| 70 | 0.04 | 0.08 | 0.13 | 0.18 | 0.25 | 0.33 | 0.42 | 0.52 | 0.63 | 0.85 |
| 80 | 0.05 | 0.09 | 0.15 | 0.22 | 0.31 | 0.41 | 0.52 | 0.65 | 0.78 | 0.95 |
| 90 | 0.06 | 0.12 | 0.21 | 0.31 | 0.44 | 0.59 | 0.75 | 0.93 | 1.12 | 1.12 |
| 100 | 0.10 | 0.24 | 0.47 | 0.75 | 1.05 | 1.46 | 1.89 | 2.34 | 2.86 | 2.22 |

Table 1 shows a two-dimensional slice of relative file size predictions for transcoding images of an input Quality Factor QF_in =80%, as a function of the scaling factor "z", and of the output Quality Factor QF_out. The table shows relative file size predictions, quantized into a matrix of 10 by 10 relative size factors. Each entry in the matrix is an example of an average relative file size prediction of a scaled JPEG image, as a function of a selected output Quality Factor QF_out and a quantized scaling factor "z". The output Quality Factor is quantized into ten values ranging from 10 to 100 indexing the rows of the matrix. The quantized scaling factor "z", ranging from 10% to 100% indexes the columns of the sub-array. Each entry in the table represents a relative size factor, that is the factor by which transcoding of an image (de-compressing, scaling, and re-compressing) with the selected parameters would be expected to change the file size of the image.

As an example, an input image of a file size of 100 KB, transcoded with a scaling factor of 70% and an output Quality Factor QF_out of 90, would be expected to yield an output image of a file size of 100 KB*0.75=75 KB. It should be noted that this result is a prediction based on the average from a large set of pre-computed transcodings, of a large number of different images—transcoding a particular image may result in a different file size.

As described in detail in the above mentioned paper, the table may be generated and optimized from a Training Set comprised of a large number of images.

The input Quality Factor QF_in of 80% was selected as representative of the majority of images found on the worldwide web. The predictive table may contain additional two-dimensional slices, representing file size predictions for transcoding images of a different input Quality Factor. Furthermore, the Table 1 was chosen as a matrix of dimension 10×10, for illustrative purposes. A matrix of a different dimension could also be used. In addition, although in the following description the parameters such as QF_in and z are quantized, it is also possible to alternatively interpolate values from the table. For instance, in Table 1, if the relative file size prediction is desired for a scaling factor of 65% and an output Quality Factor QF_out of 75, linear interpolation could be used to obtain a relative file size of (0.33+0.42+0.41+0.52)/4=0.42.

For the remainder of the description of the embodiments of the invention, an input Quality Factor QF_in of 80% is assumed, and the 10×10 size Table 1 will be used.

It is evident by inspection of the Table 1 that several combinations of QF_out and scaling factor "z" may lead to the same approximate predicted file size, which raises the question of which combination would maximize subjective user experience, or objective quality.

Objective quality may be calculated in a number of different ways. In the first embodiment of the invention, a quality metric is proposed in which the input (before transcoding) and output (after transcoding) images are compared. The so-called peak signal-to-noise ratio (PSNR) is commonly used as a measure of quality of reconstruction in image compression. Other metrics, such as "maximum difference" (MD) could also be used without loss of generality.

Figure 2:
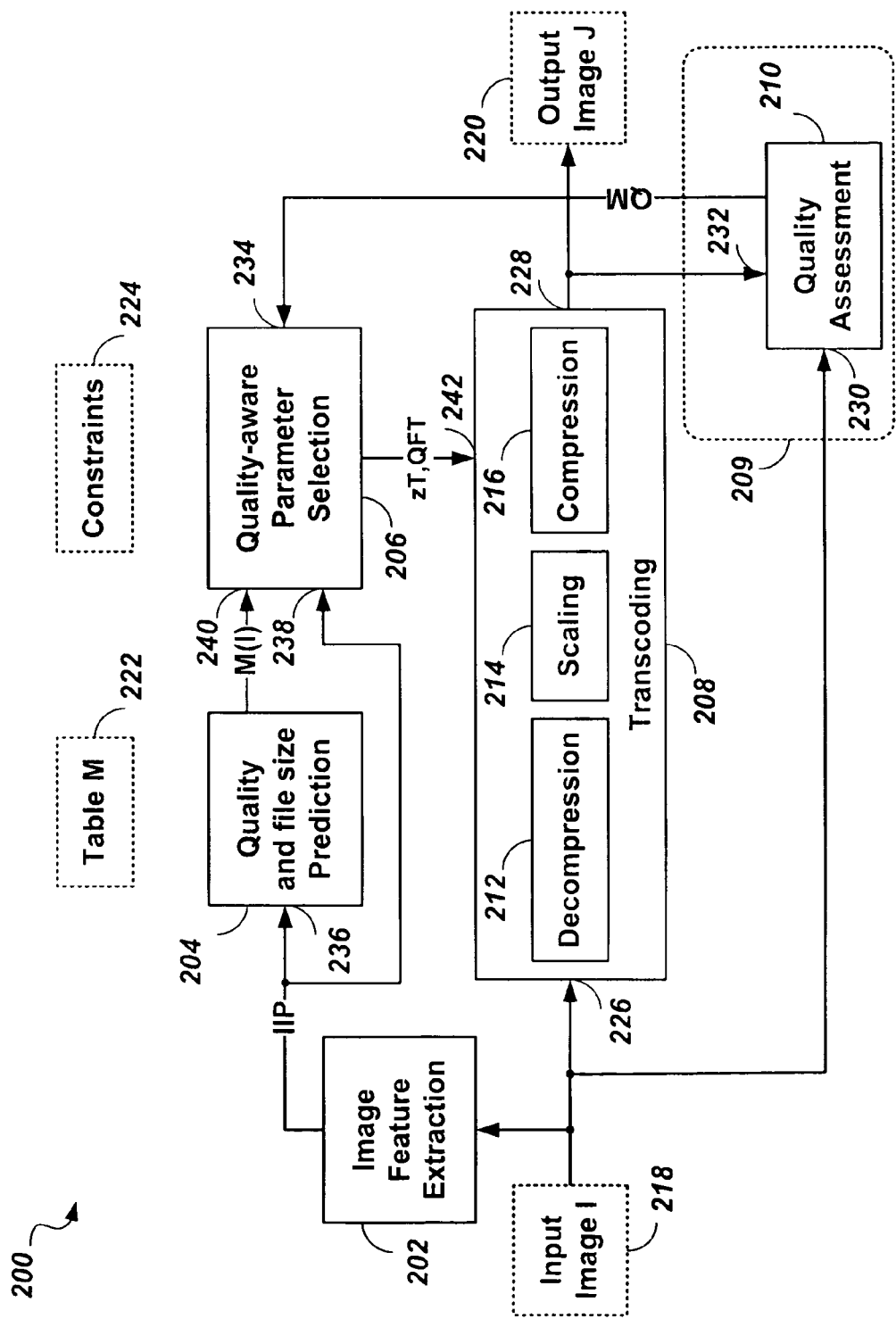
FIG. 2 illustrates a basic quality-aware image transcoding system 200 (Basic System)

FIG. 2 illustrates a basic quality-aware image transcoding system 200 (Basic System), including a computer, having a computer readable storage medium having computer executable instructions stored thereon, which when executed by the computer, provide the following modules: an Image Feature Extraction module 202; a Quality and File Size Prediction module 204; a Quality-aware Parameter Selection module 206; a Transcoding module 208; and a Basic Quality Determination Block 209 which includes a Quality Assessment module 210. The Transcoding module 208 includes modules for Decompression 212; Scaling 214; and Compression 216. The Basic System 200 further includes means (e.g. data storage) for storing: an input image (Input Image "I") 218; an output image (Output Image "J") 220; a predictive Table "M" 222; and a set of terminal constraints (Constraints) 224. The set of terminal constraints 224 includes a maximum device file size S(D), and maximum permissible image dimensions of the device, that is a maximum permissible image width W(D), and maximum permissible image height H(D).

The table "M" 222 may be obtained as shown in the "Kingston" paper referenced above, and from which Table 1 has been reproduced as an example of a sub-array of the Table "M" 222.

The input image "I" 218 is coupled to an image input 226 of the Transcoding module 208, to be transformed and output at an image output 228 of the Transcoding module 208, and coupled into the output image "J" 220.

The input image "I" 218 is further coupled to an input of the Image Feature Extraction module 202, and to a first image input 230 of the Quality Assessment module 210.

The image output 228 of the Transcoding module 208 that outputs the output image "J" 220 is further coupled to a second image input 232 of the Quality Assessment module 210. The Quality Assessment module 210 outputs a Quality Metric "QM" which is sent to a QM-input 234 of the Quality-aware Parameter Selection module 206.

The output of the Image Feature Extraction module 202 is a set of input image parameters "IIP" that is coupled to an IIP-input 236 of the Quality and File Size Prediction module 204 as well as to an image parameter input 238 of the Quality-aware Parameter Selection module 206. The set of input image parameters "IIP" includes the file size S(I), the encoding quality factor QF(I), and the width and height dimensions W(I) and H(I) of the Input Image "I" 218.

The output of the Quality and File Size Prediction module 204 is a sub-array M(I) of the Table "M" 222, i.e. the slice of the Table "M" 222 indexed by QF_in =QF(I) that corresponds to the quantized encoding quality factor of the Input Image "I" 218. The sub-array M(I) is input to a file size prediction input 240 of the Quality-aware Parameter Selection module 206.

The output of the Quality-aware Parameter Selection module 206 is a set of transcoding parameters including a transcoder scaling factor "zT" and an transcoder Quality Factor "QFT". These transcoding parameters are coupled to a transcoding parameter input 242 of the Transcoding Module 208.

In the preferred embodiment, the Basic System 200 may be conveniently implemented in a software program, in which the modules 202 to 216 may be software modules a subroutine functions, and the inputs and outputs of the modules are function calling parameters and function return values respectively. Data such as the Input Image 1218, the Output Image 1220, and the Table "M" 222, may be stored as global data, accessible by all functions. The set of terminal constraints 224 may be obtained from a data base of device characteristics.

Transcoding of the input image "I" 218 is accomplished in the Transcoding Module 208 by decompressing it in the Decompression module 212, scaling it in the Scaling module 214 with the transcoder scaling factor "zT", and compressing the scaled image in the Compression module 216 with the transcoder Quality Factor "QFT".

The transcoding parameters zT and QFT thus control the transcoding operation, where the values of these transcoding parameters are determined by the Quality-aware Parameter Selection module 206. The purpose of the Quality Assessment module 210 is to compare the Input Image "I" 218 with the Output Image "J" 220 and compute the Quality Metric "QM", which should be a measure of the distortion introduced by the transcoding process. In the preferred embodiment of the invention, the Quality Metric "QM" is computed explicitly as the PSNR of the image pair (Images "J" and "I"), and measured in dB, a high dB value indicating less distortion, i.e. higher quality.

The Quality and File Size Prediction module 204 uses the encoding quality factor QF(I) of the set of input image parameters "IIP", to select the sub-array M(I) of the Table "M" 222, the sub-array M(I) representing the predicted relative output file size for transcoding any image that was originally encoded with the quality factor QF(I), e.g. the Input Image "I" 218. The quality factor QF(I) is the quantized nearest equivalent of the actual input Quality Factor QF_in.

The Quality-aware Parameter Selection module 206 includes computational means for selecting feasible value pairs (zT,QFT) of the transcoding parameters zT and QFT, where feasible is defined as follows:

from the full range of transcoding parameters, a distinct value pair (zT,QFT) is selected from the index ranges ("z", and QF_out) of the Table "M" 222;

the value pair (zT,QFT) is accepted if the transcoder scaling factor zT does not exceed a maximum scaling factor "z_max", where the maximum scaling factor "z_max" is determined from the set of terminal constraints 224 such that neither the maximum permissible image width W(D) nor height H(D) is exceeded, otherwise another distinct value pair (zT,QFT) is selected;

the value pair (zT,QFT) is then used to index the sub-array M(I) to determine a corresponding predicted relative output file size sT; and the value pair (zT,QFT) is deemed feasible if the predicted relative output file size sT does not exceed a maximum relative file size s_max, where s_max is the lesser of unity (1) or the ratio calculated by dividing the maximum device file size S(D) from the Constraints 224 by the actual file size S(I) of the input image "I" 218, otherwise another distinct value pair (zT,QFT) is selected.

Computational means for iteratively seeking a distinct value pair (zT,QFT) until the Quality Metric QM is optimal include a loop for each feasible combination of zT and QFT:

a transcoding operation (Input Image "I" 218 to Output Image "J" 220) is performed by the Transcoding module 208;

the resulting Output Image "J" 220 has an actual file size S(J), and the transcoding may still be rejected if a resulting relative file size, obtained by dividing the actual file size S(J) of the Output Image "J" 220 by the actual file size S(I) of the input image "I" 218, exceeds the maximum relative file size s_max.

the quality of the transcoding is assessed in the Quality Assessment module 210 (see below for more details) by generating the Quality Metric QM for the specific transcoding; and the Output Image "J" 220 with the highest associated Quality Metric QM is retained as a best image.

Comparison of the Input Image "I" 218 with the Output Image "J" 220 in the Quality Assessment module 210 is complicated by the fact that at least one additional scaling operation is required in order that two images with equal image resolution can be compared.

Figure 3:
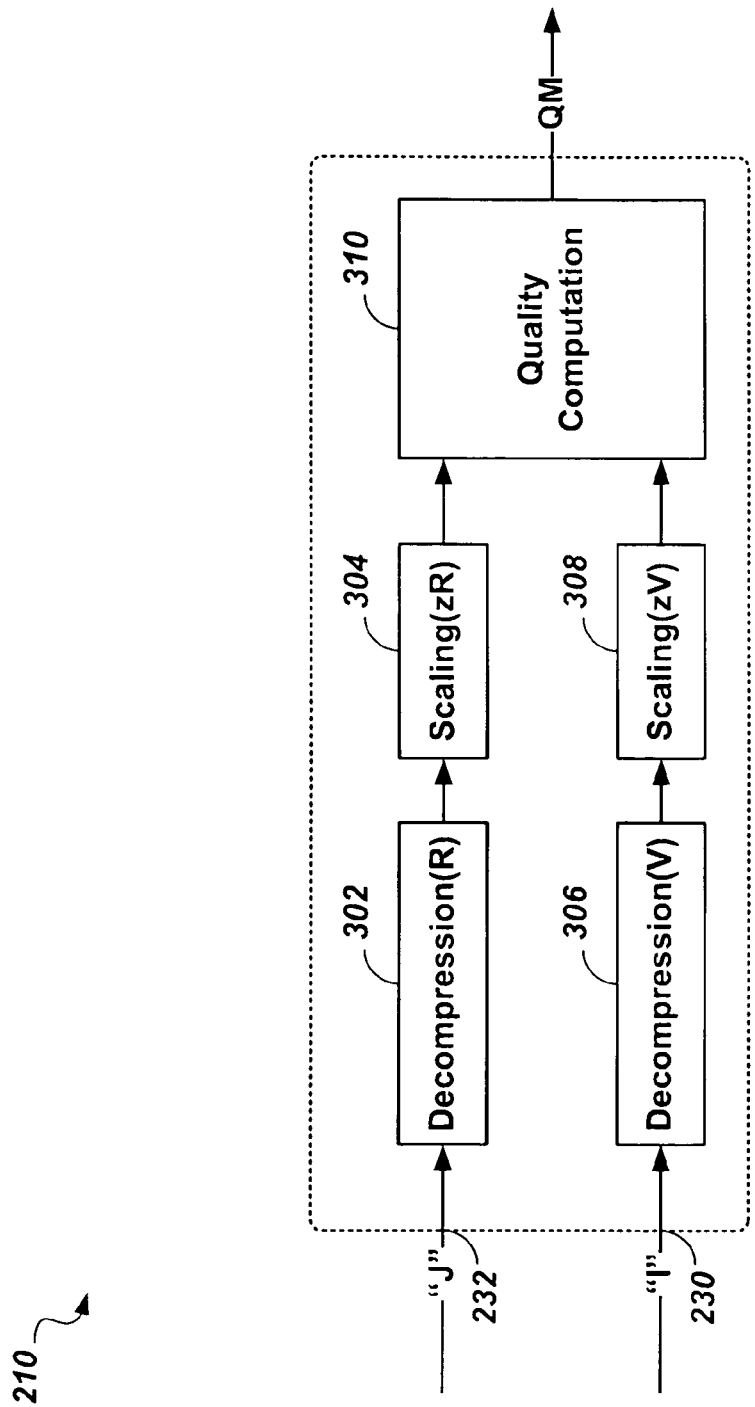
FIG. 3 shows details of the Quality Assessment module 210 of the Basic System 200.

FIG. 3 shows details of the Quality Assessment module 210 of the Basic System 200. The Quality Assessment module 210 comprises a Decompression(R) module 302; a Scaling(zR) module 304; a Decompression(V) module 306; a Scaling(zV) module 308; and a Quality Computation module 310. The input image "I" coupled to the first image input 230 of the Quality Assessment module 210 is decompressed with the Decompression(V) module 306, scaled with the Scaling (zV) module 308, and coupled to a first input of the Quality Computation module 310. Similarly, the output image "J" coupled to the second image input 232 is decompressed with the Decompression(R) module 302, scaled with the Scaling (zR) module 304, and coupled to a second input of the Quality Computation module 310. The Quality Computation module 310 generates the Quality Metric QM.

Two re-scaling parameters are defined, a re-scaling factor zR used in the Scaling(zR) module 304, and a viewing scaling factor zV used in the Scaling(zV) module 308.

For the image resolutions to be equal, we must have zV=zT*zR where zT is the transcoder scaling factor zT described above. The viewing scaling factor zV must be less or equal 1, since we never want to increase the original image's resolution when comparing quality. The transcoder scaling factor zT is always less or equal to one, and chosen to satisfy the device constraints.

The viewing scaling factor zV is dependent on the viewing conditions for which the output image "J" is scaled, and should be chosen to maximize (optimize) the viewer experience, i.e. the anticipated subjective image quality.

Three cases are of interest:

Viewing case 1: zV=1. The images are compared at the resolution of the input image "I". This corresponds to zR=1/zT, that is the output image "J" needs to be scaled up.

Viewing case 2: zV=zT. The images are compared at the resolution of the output image "J" therefore zR=1.

Viewing case 3: zT<zV<1. The images are compared at a resolution between the original ("I") and the transcoded ("J") image resolutions, thus zR=zV/zT. This will result in zR>1, that is the output image "J" may need to be scaled up.

The expected viewing conditions, corresponding to the choice of the viewing scaling factor zV, play a major role in the user's appreciation of the transcoded results. If the output image "J" will only be viewed on the terminal, the viewing case 2 could be a good choice.

However, if the output image "J" might be transferred to another, more capable device later (e.g. a personal computer) where it may be scaled up again, the resolution of the original image (the input image "I") must be considered, leading to the viewing case 1.

The viewing case 3 could be used when the output image "J" is viewed at a resolution between the transcoded resolution and the resolution of the original image (the input image "I"), for example at the maximum resolution supported by the device where the user can pan and zoom on the device, limited only by its resolution.

The viewing case 3 is the most general case in which both the input and the output images are scaled by the scaling factors zV and zR respectively. In the special cases (viewing case 1 and viewing case 2) some processing efficiencies may be obtained in the Quality Computation module 310, as may be readily understood.

For example, in the viewing case 1 (zV=1), no actual re-scaling of the input image "I" is required for the comparison. Consequently, the already decompressed input image "I" is already available at the output of the Decompression module 212 of the Transcoding module 208, and may be used directly in the Quality Computation module 310.

Similarly in the viewing case 2, no actual re-scaling of the output image "J" is required for the comparison. Consequently, the output image "J" needs to be only decompressed in the Decompression(R) module 302, and the re-scaling operation in the Scaling(zR) module 304 may be skipped.

Due to the quantization inherent in scaling and compression operations in general, there will be distortion in the transcoded image (the output image "J"), compared to the original image (the input image "I"). Similarly, the re-scaling of one or both of these images in the Quality Assessment module 210 introduces additional distortions. As a consequence, the viewing conditions corresponding to the three cases described above may result in different results in the quality computation, and the best quality image may be obtained with different parameter settings of the transcoding parameters in the value pair (zT,QFT), depending on the choice of the viewing scaling factor zV and the resultant re-scaling factor zR. The viewing scaling factor zV (and implicitly zR) may be chosen and set in the Quality and File Size Prediction module 204 according to the intended application of the Basic System 200. In the simplest case, the viewing scaling factor zV is set equal to the transcoder scaling factor zT (the viewing case 2). If the image is to be optimized for viewing on the terminal only, it is proposed that the viewing conditions be set to correspond to the maximum resolution supported by the device.

Figure 4:
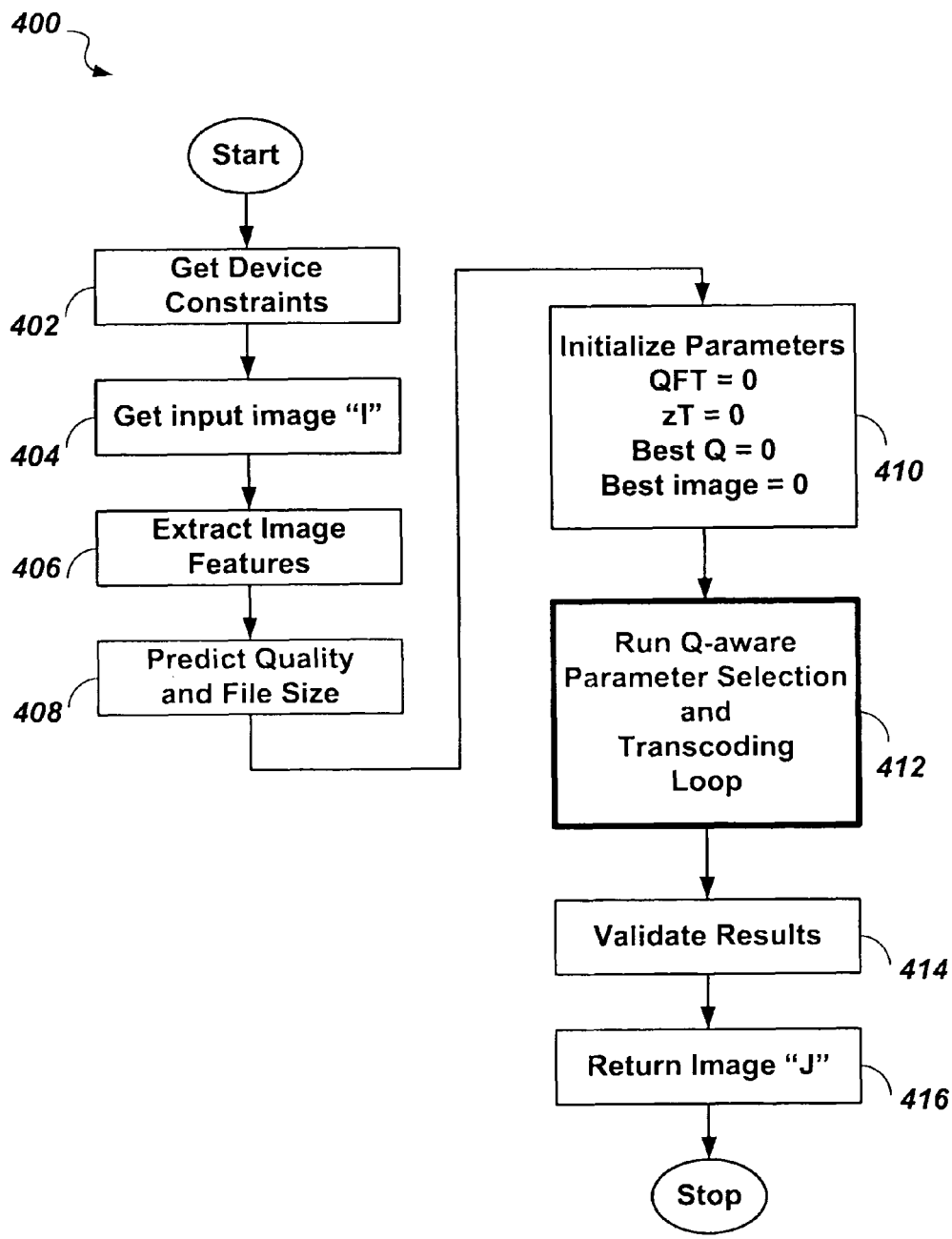
FIG. 4 is a flow chart of a basic quality-aware parameter selection method (Basic Method) 400 for the selection of parameters in JPEG image transcoding, corresponding to the Basic System 200.

FIG. 4 is a flow chart of a basic quality-aware parameter selection method (Basic method) 400 for the selection of parameters in JPEG image transcoding, corresponding to the Basic System 200. The Basic method 400 includes the following sequential steps:

step 402 "Get Device Constraints";
step 404 "Get Input Image I";
step 406 "Extract Image Features";
step 408 "Predict Quality and File Size";
step 410 "Initialize Parameters";
step 412 "Run Quality-aware Parameter Selection and Transcoding Loop";
step 414 "Validate Result"; and
step 416 "Return Image J".

In the step 402 "Get Device Constraints" the set of terminal constraints (cf. Constraints 224, FIG. 2) including the maximum device file size S(D), the maximum permissible image width W(D), and the maximum permissible image height H(D) of the display device (cf. Destination Node 106, FIG. 1) are obtained, either from a database or directly from the display device through a network.

In the step 404 "Get Input Image I" the image to be transcoded (the input Image "I") is received from an originating terminal or server (cf. Originating Node 102, FIG. 1).

In the step 406 "Extract Image Features" (cf. Image Feature Extraction module 202, FIG. 2) a set of input image parameters including the file size S(I), the image width W(I), the image height H(I) and the encoding quality factor QF(I) are obtained from the input image "I". In JPEG encoded images, the file size S(I), the image width W(I), and the image height H(I) are readily available from the image file. The quality factor QF(I) used in the encoding of the image may not be explicitly encoded in the image file, but may be estimated fairly reliably following a method described in "JPEG compression metric as a quality aware transcoding" by Surendar Chandra and Carla Schlatter Ellis, Unix Symposium on Internet Technologies and Systems, 1999. Alternatively, the quality factor QF(I) of the input image "I" may simply be assumed to be a typical quality factor of the application, e.g. 80%.

In the step 408 "Predict Quality and File Size" (cf. Quality and File Size Prediction module 204, FIG. 2) the viewing conditions are established, i.e. a suitable value for the viewing scaling factor zV is chosen:

$$zV=\min(W(D)/W(I), H(D)/H(I), 1),$$

that is zV is the smallest of the ratio of the maximum permissible image width W(D) to the input image width W(I), the ratio of the a maximum permissible image height H(D) to the input image height H(I), and one (1). It is assumed that the aspect ratio of the image is normally to be preserved in the transcoding. The upper limit of one (1) is to ensure that zV does not exceed 1 even if the display device is capable of displaying a larger image than the original input image "I". In a modification it is possible to apply different scaling factors in the transcoding horizontally and vertically where this is deemed desirable.

Quantizing the encoding quality factor QF(I) to the index QF_in, the sub-array M(I) of the Table "M" 222 is retrieved, either from a local file or a database. The sub-array M(I) includes relative file size predictions as a function of the scaling factor "z" and the output Quality Factor QF_out that will be used in compressing the scaled image (QF_out). The sub-array M(I) may also include columns indexed by scaling factors ("z") that exceed zV, and relative file size predictions that exceed the maximum relative file size s_max of the display device; the remaining entries in the sub-array M(I) are indexed by a set of feasible index value pairs ("z",QF_out).

In the step 410 "Initialize Parameters" a number of variables are initialized to prepare for the steps to follow. These variables are:

a best transcoder Quality Factor=0;
a best transcoder scaling factor=0;
a best Quality Metric QM=0; and
a best image=NIL.

Also initialized are two limits, a maximum relative file size s_max and a maximum scaling factor z_max. The maximum relative file s_max is calculated by dividing the maximum device file size S(D) by the actual file size S(I) of the input image "I" 218, limited to unity (1). The maximum scaling factor z_max is given by the viewing scaling factor zV that was already calculated in the previous step, that is z_max=zV.

The step 412 "Run Quality-aware Parameter Selection and Transcoding Loop" is a loop which: takes distinct valid value pairs ("z",QF_out) from the sub-array M(I); assigns zT and QFT to these values; causes the input Image "I" to be transcoded into the output Image "J" with zT and QFT; calculates the resulting Quality Metric QM; and runs the loop until the best image is found, that is "best" in the sense of attaining the highest Quality Metric QM. At the same time, the loop may also track the transcoder Quality Factor QFT and the transcoder scaling factor zT that was used in the transcoding step that yielded the best output image (not shown in FIG. 5), but this is not strictly necessary since ultimately only the best image is of interest.

Figure 5:
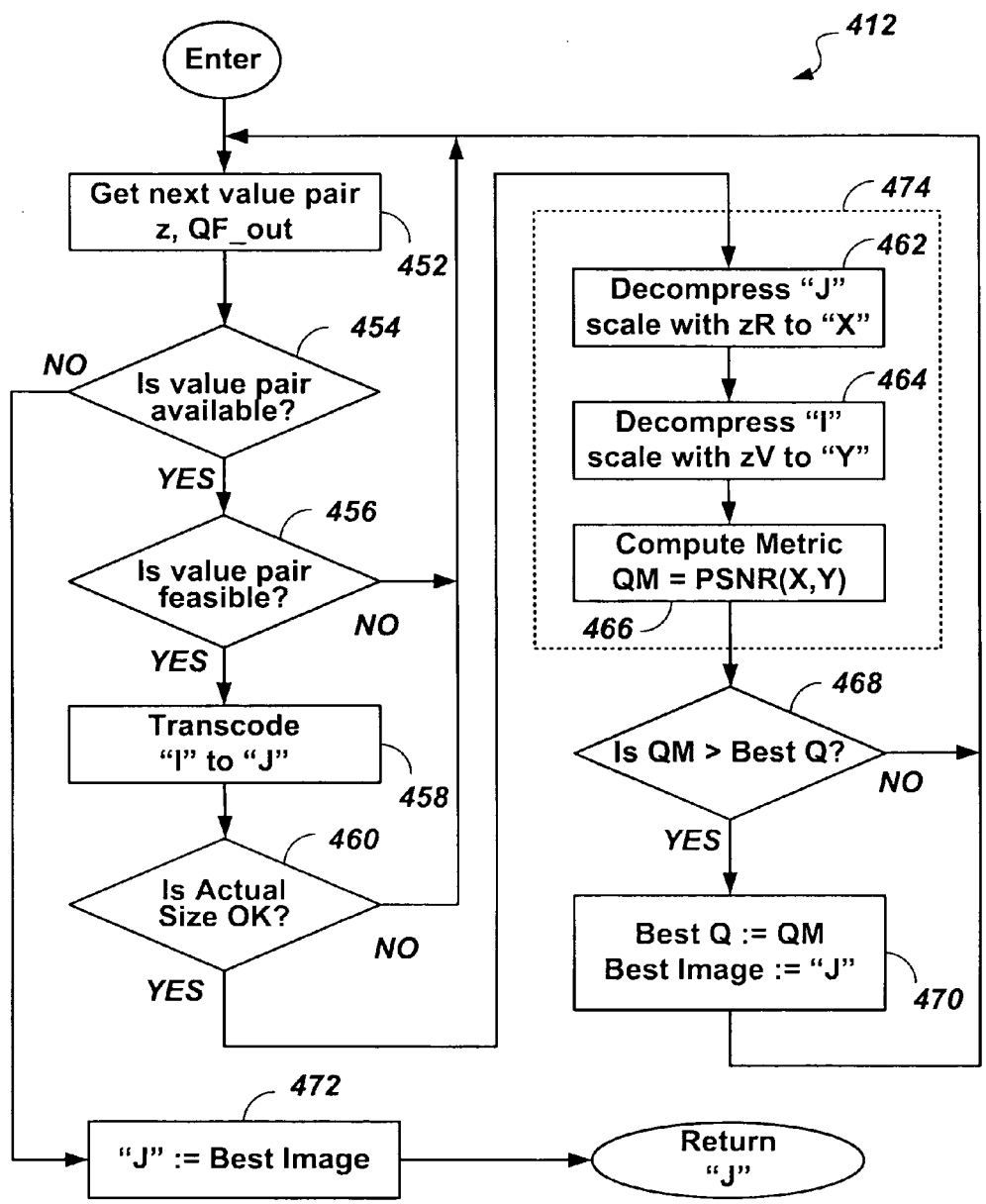
FIG. 5 is a flow chart showing an expansion of the step 412 "Run Quality-aware Parameter Selection and Transcoding Loop" of the Basic Method 400.

FIG. 5 is a flow chart showing an expansion of the step 412 "Run Quality-aware Parameter Selection and Transcoding Loop" of the Basic Method 400, with the following sub steps:

step 452 "Get Next Value Pair";
step 454 "Is Value Pair Available?";
step 456 "Is Value Pair feasible?";
step 458 "Transcode I to J";
step 460 "Is Actual Size OK?";
step 462 "Decompress J and scale with zR to X";
step 464 "Decompress I and scale with zV to Y";
step 466 "Compute Metric QM=PSNR(X,Y)";
step 468 "Is QM>Best Q?";
step 470 "Set Best Q :=QM, Best Image :=J"; and
step 472 "Set J :=Best Image".

The steps 462 to 466 together are "Quality Assessment Step" 474 comprising the functionality of the Quality Assessment (cf. Quality Assessment module 210, FIG. 2).

In the step 452 "Get Next Value Pair" the next value pair ("z",QF_out) indexing the sub-array M(I) is taken, as long as a distinct value pair is available.

In the step 454 "Is Value Pair Available?" a test is made if a distinct value pair is available. If it is available (YES from the step 454) execution continues with the step 456 "Is value pair feasible?", otherwise (NO from the step 454) the loop exits to the step 472 "Set J :=Best Image" because all distinct value pairs have been exhausted.

In the step 456 "Is Value Pair feasible?" two tests are made. First the scaling factor "z" from the value pair ("z",QF_out) is compared with the maximum scaling factor z_max. The value pair ("z",QF_out) is not valid, hence not feasible, if the scaling factor "z" exceeds the maximum scaling factor z_max. If the value pair ("z",QF_out) is not valid, the step 456 "Is value pair feasible?" exits immediately with ("NO") and execution jumps back to the beginning of the loop.

Then a predicted relative file size s, is read from the sub-array M(I) indexed by the distinct value pair ("z",QF_out), and compared with the maximum relative file size s_max. If the predicted relative file size s is acceptable, i.e. does not exceed the maximum relative file size s_max, the step 456 "Is Value Pair feasible?" exits with "YES" and execution continues with the step 458 "Transcode I to J", otherwise (NO from the step 456) execution jumps back to the beginning of the loop, that is to the step 452 "Get Next Value Pair".

In the step 458 "Transcode I to J" the input Image "I" is decompressed; scaled with a transcoder scaling factor zT="z"; and the scaled image is compressed with a transcoder Quality Factor QFT=QF_out, resulting in the output image "J".

In the step 460 "Is Actual Size OK?" an actual relative size s_out is computed by dividing the file size of the output image "J" by the file size of the input image "I". If the actual relative size s_out does not exceed the maximum relative file size s_max (YES from the step 460), execution continues with the step "Quality Assessment Step" 474 otherwise (NO from the step 460) execution jumps back to the beginning of the loop, that is to the step 452 "Get Next Value Pair". Note that the actual relative size s_out may in fact be larger than the predicted relative file size "s".

In the step 462 "Decompress J and scale with zR to X" of the "Quality Assessment Step" 474, the output image "J" is decompressed and scaled with the re-scaling factor zR calculated as zR=zV/zT, resulting in a first intermediate image which is a re-scaled output image "X". Similarly, in the step 464 "Decompress I and scale with zV to Y" the input image "I" is decompressed and scaled with the viewing scaling factor zV, resulting in a second intermediate image which is a re-scaled input image "Y". As described above, the viewing scaling factor zV was earlier selected to maximize the user experience. Three viewing cases 1 to 3 may be considered.

In the step 466 "Compute Metric QM=PSNR(X,Y)" the value of the quality metric QM is computed as the peak signal-to-noise ratio (PSNR) of the rescaled output and input images "J" and "I". Alternatively a different metric, for example based on "maximum difference" (MD) could also be used without loss of generality.

In the step 468 "Is QM>Best Q?" the computed quality metric QM is compared with the best quality metric found in the loop so far. Note that "best Q" was initialized to zero before the start of the step 412 "Run Quality-aware Parameter Selection and Transcoding Loop" and is the best quality metric found so far. If the computed quality metric QM is larger than best Quality Metric ("best Q", YES from the step 468), execution continues with the step 470 "Set Best Q:=Q, Best Image :=J" otherwise (NO from the step 468) execution jumps back to the beginning of the loop, that is to the step 452 "Get Next Value Pair".

In the step 470 "Set Best Q:=QM, Best Image :=J" the best results so far are saved, that is the highest Quality Metric "Best Q is set equal to the computed quality metric Q; the best image is set equal to the output image "J"; and the transcoding parameters QF_out and zT may be saved as best transcoder Quality Factor and best transcoder scaling factor (not shown in FIG. 5) respectively. After the step 470, the execution jumps back to the beginning of the loop, that is to the step 452 "Get Next Value Pair", to possibly find a better transcoding of the input image "I", until all feasible parameter pairs are exhausted. When the loop finally exits (NO from the step 454 "Is Value Pair Valid?"), execution continues to the step 472

"Set J:=Best Image" the output image "J" in which the output image "J" is set to equal the Best Image found in the execution of the loop.

This completes the description of the expanded step 412 "Run Quality-aware Parameter Selection and Transcoding Loop" after which execution continues with the step 414 "Validate Result" (FIG. 4).

In the step 414 "Validate Result" a simple check confirms that a valid Best Image was actually found and assigned to the output Image "J" (i.e that "J" is not NIL). It is possible that during the execution of the step 412 "Run Quality-aware Parameter Selection and Transcoding Loop" no feasible transcoding parameters were found, and Best Image remains NIL and thus the output image "J" is set to NIL. This would be an abnormal or fault condition, and the process would return an exception error to the adaptation engine 108.

With the final step 416 "Return Image J", the basic method 400 for quality-aware selection of parameters in JPEG image transcoding ends by returning the transcoded output image "J" to the system.

The Basic System 200 with the basic method 400 for quality-aware selection of parameters could thus be employed to provide a quality-aware transcoder, albeit at a high processing cost because many transcoding and scaling operations may need to be performed to find the best Output Image "J" for a given input image "I" and a set of terminal constraints.

Figure 15:
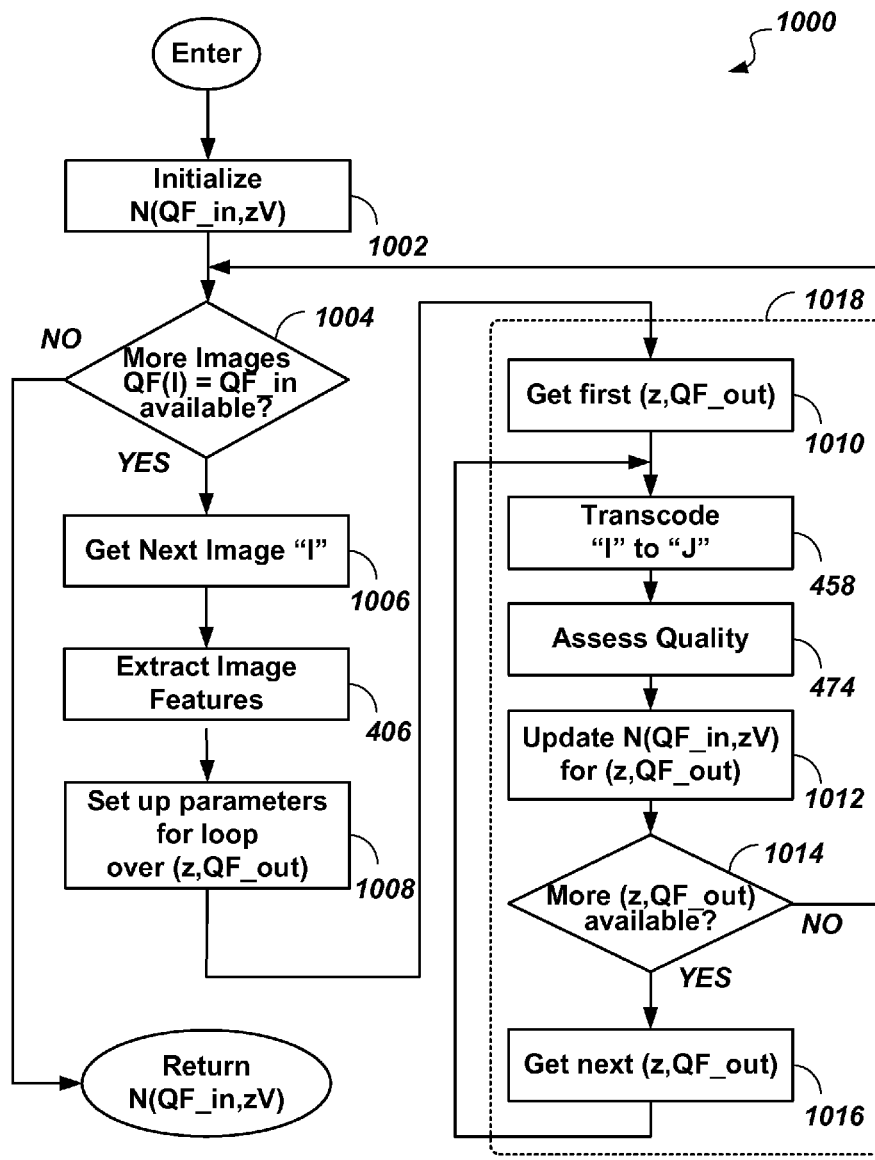
FIG. 15 is a flow chart of a quality prediction table generation method 1000, illustrating the functionality of the quality prediction table generation system 500 of FIG. 6.

More efficient systems may be constructed by augmenting or replacing the Quality-aware Parameter Selection and Transcoding Loop with a look up table that contains predicted quality metric information, the table index being derived from the input image constraints, device constraints, and viewing conditions. The input image constraints include the height, width, and original quality factor of the input image; the device constraints include the dimensions and the maximum file size of the output image; and the viewing conditions are represented by the desired scaling factor for which the quality is intended to be optimal. Such a look up table may be generated off-line with a prediction table generation system such as is described in the following (FIG. 6) and a corresponding quality prediction table generation method (FIG. 15).

Figure 6:
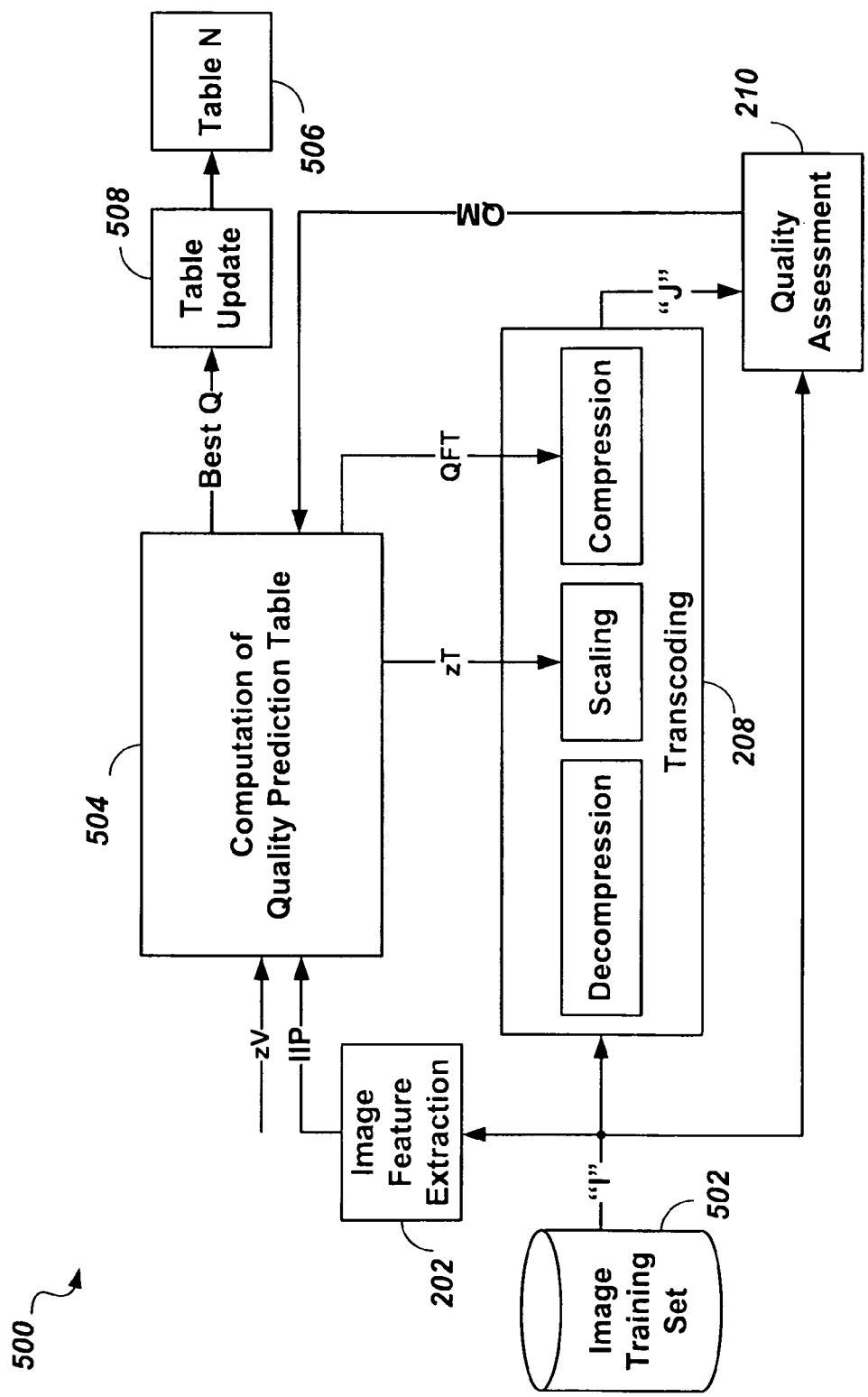
FIG. 6 shows a quality prediction table generation system 500.

FIG. 6 shows a quality prediction table generation system 500, comprising a computer, having a computer readable storage medium having computer executable instructions stored thereon, which when executed by the computer, provide the following modules: a database containing a Training Set of Input Images 502; a Computation of Quality Prediction Table module 504; storage for a quality prediction Table "N" 506, and a Table Update module 508. The quality prediction table generation system 500 further includes the following modules that are the same as the modules numbered with the same reference numerals in the Basic System 200: the Image Feature Extraction module 202; the Transcoding module 208; and the Quality Assessment module 210.

The Training Set of Input Images 502 contains a large number of JPEG images, for example the image Training Set of 70,300 files described in the "Kingston" paper by Steven Pigeon et al, mentioned above. Its output is a sequence of input Images "I" which are individually input to the Image Feature Extraction module 202, the Transcoding module 208, and the Quality Assessment module 210, as in the Basic System 200.

The purpose of the quality prediction table generation system 500 is to generate the quality prediction Table "N" 506 by transcoding each of the images contained in the Training Set of Input Images 502 for a range of the transcoder scaling factor zT representative of viewing conditions (viewing scaling factor zV), and a range of the input Quality Factor QF_out.

The quality prediction Table "N" 506 is a multi-dimensional table, e.g., a four-dimensional table, which contains a Quality Metric Q indexed by four index variables: an encoding quality factor QF_in of an input image from the Training Set of Input Images 502, a viewing scaling factor zV, an encoding quality factor QF_out to be used in compressing the output image in the transcoder, and a transcoder scaling factor zT. These index variables are generated in the following manner.

The encoding quality factor QF_in of the input image is inherent in the input image from the Training Set of Input Images 502, and may be extracted from each image as QF(I) in the Image Extraction Module 202 and quantized, as described above. It may also be more convenient to partition the image training set into groups of images clustered around a given quantized encoding quality factor QF_in, for example 80%.

The viewing conditions include at least three distinct viewing cases, defined by different values of the viewing scaling factor zV as described above. In generating the Table "N" 506, it is convenient to generate a range of values for zV, for example in quantized steps of 10%.

The quality prediction table generation system 500 is thus similar to the Basic System 200 but generates the transcoder Quality Factor QF_out and the transcoder scaling factor zT directly instead of calculating them to meet device constraints as in the Basic System 200.

The Training Set of Input Images 502 sends each of its images as input image "I" to: the Image Feature Extraction module 202; the Transcoding module 208; and the Quality Assessment module 210. The Image Feature Extraction module 202 sends the set of input image parameters "HP" to the Computation of Quality Prediction Table module 504; the Quality Assessment module 210 sends its computed quality measure QM to the Computation of Quality Prediction Table module 504; and the Computation of Quality Prediction Table module 504 controls the Transcoding module 208 with the transcoding parameter pair (zT,QFT). The Transcoding module 208 generates the output image "J" and sends it to the Quality Assessment module 210.

The Table "N" 506 is initially empty. For each of the input images of the Training Set of Input Images 502, and for each of a range of viewing conditions (represented by the viewing scaling factor zV) and each of a range of transcoder scaling factors zT, and for each of a range of encoding quality factor QF_out, the quality prediction table generation system 500 generates a best transcoded image (the output Image "J") with the best quality metric Q. Each computed best quality metric Q ("Best Q"), along with the four index values (QF_in, zV, QF_out, and zT) of each computation are sent to update the Table "N" 506 via the Table Update module 508.

Because many images will generate a value of the best quality metric Q for the same index but slightly different actual value, the raw data generated by the quality prediction table generation system 500 may advantageously be collected and processed in the Table Update module 508 in a manner similar to that described in the "Kingston" paper by Steven Pigeon et al, mentioned above. In this way, by grouping and quantizing the data, optimal LMS (least mean squares) estimators of the quality metrics for combinations of the four index values, may be computed and stored in the quality prediction Table "N" 506.

Tables 2, 3, and 4 below show two-dimensional sub-tables of an instance of the quality prediction Table "N" 506, as examples that have been computed with the quality prediction table generation system 500 according to the embodiment of the invention.

TABLE 2

| QF_out | scaling z | | | | | | | | | |
|---|---|---|---|---|---|---|---|---|---|---|
| | 10% | 20% | 30% | 40% | 50% | 60% | 70% | 80% | 90% | 100% |
| 10 | 17.3 | 19.3 | 20.6 | 21.6 | 22.1 | 23.0 | 23.5 | 24.0 | 24.4 | 26.2 |
| 20 | 17.8 | 20.1 | 21.6 | 22.7 | 23.2 | 24.4 | 25.1 | 25.8 | 26.4 | 28.7 |
| 30 | 18.0 | 20.4 | 22.0 | 23.2 | 23.7 | 25.1 | 25.9 | 26.7 | 27.4 | 30.2 |
| 40 | 18.1 | 20.6 | 22.2 | 23.5 | 23.9 | 25.5 | 26.3 | 27.3 | 28.1 | 31.9 |
| 50 | 18.2 | 20.7 | 22.4 | 23.7 | 24.1 | 25.7 | 26.7 | 27.7 | 28.6 | 32.5 |
| 60 | 18.4 | 20.8 | 22.6 | 23.9 | 24.2 | 26.0 | 27.0 | 28.1 | 29.1 | 33.0 |
| 70 | 18.4 | 21.0 | 22.7 | 24.1 | 24.4 | 26.3 | 27.3 | 28.6 | 29.7 | 37.3 |
| 80 | 18.4 | 21.1 | 22.9 | 24.4 | 24.6 | 26.6 | 27.8 | 29.3 | 30.6 | 54.9 |
| 90 | 18.6 | 21.3 | 23.2 | 24.7 | 24.9 | 27.1 | 28.3 | 30.1 | 31.6 | 48.0 |
| 100 | 18.7 | 21.5 | 23.4 | 25.0 | 25.1 | 27.5 | 28.8 | 30.7 | 32.2 | 51.4 |

TABLE 3

| QF_out | scaling z | | | | | | | | | |
|---|---|---|---|---|---|---|---|---|---|---|
| | 10% | 20% | 30% | 40% | 50% | 60% | 70% | 80% | 90% | 100% |
| 10 | 22.5 | 23.7 | 24.4 | 24.9 | 25.3 | 25.7 | 26.0 | 26.3 | 26.6 | 26.2 |
| 20 | 24.5 | 25.8 | 26.6 | 27.1 | 27.6 | 28.0 | 28.5 | 28.8 | 29.2 | 28.7 |
| 30 | 25.6 | 27.0 | 27.8 | 28.4 | 28.9 | 29.4 | 29.9 | 30.3 | 30.7 | 30.2 |
| 40 | 26.4 | 27.8 | 28.6 | 29.3 | 29.8 | 30.4 | 30.9 | 31.4 | 31.7 | 31.9 |
| 50 | 27.1 | 28.5 | 29.3 | 30.0 | 30.6 | 31.1 | 31.7 | 32.2 | 32.6 | 32.5 |
| 60 | 27.8 | 29.2 | 30.1 | 30.7 | 31.3 | 31.9 | 32.5 | 33.0 | 33.4 | 33.0 |
| 70 | 28.8 | 30.1 | 31.0 | 31.8 | 32.4 | 33.0 | 33.6 | 34.1 | 34.6 | 37.3 |
| 80 | 30.2 | 31.6 | 32.5 | 33.3 | 33.9 | 34.6 | 35.2 | 35.8 | 36.4 | 54.9 |
| 90 | 32.9 | 34.2 | 35.2 | 36.1 | 36.8 | 37.6 | 38.2 | 39.0 | 39.5 | 48.0 |
| 100 | 39.4 | 41.0 | 42.5 | 44.0 | 45.5 | 46.3 | 47.2 | 48.0 | 48.6 | 51.4 |

TABLE 4

| | scaling z | | | | | | | | | |
|---|---|---|---|---|---|---|---|---|---|---|
| QF_out | 10% | 20% | 30% | 40% | 50% | 60% | 70% | 80% | 90% | 100% |
| 10 | 18.2 | 20.3 | 21.7 | 22.8 | 23.8 | 24.6 | 25.3 | 25.8 | 26.6 | 27.6 |
| 20 | 18.9 | 21.3 | 22.9 | 24.2 | 25.3 | 26.3 | 27.1 | 27.7 | 29.2 | 30.5 |
| 30 | 19.2 | 21.7 | 23.4 | 24.8 | 26.1 | 27.1 | 28.1 | 28.7 | 30.7 | 32.1 |
| 40 | 19.5 | 22.0 | 23.8 | 25.2 | 26.5 | 27.6 | 28.6 | 29.3 | 31.7 | 33.8 |
| 50 | 19.6 | 22.2 | 24.0 | 25.5 | 26.9 | 28.0 | 29.0 | 29.7 | 32.6 | 34.5 |
| 60 | 19.8 | 22.4 | 24.2 | 25.8 | 27.2 | 28.4 | 29.4 | 30.1 | 33.4 | 35.0 |
| 70 | 19.9 | 22.6 | 24.5 | 26.1 | 27.6 | 28.8 | 29.9 | 30.5 | 34.6 | 39.1 |
| 80 | 20.1 | 22.9 | 24.8 | 26.5 | 28.0 | 29.3 | 30.4 | 31.1 | 36.4 | 55.9 |
| 90 | 20.4 | 23.2 | 25.2 | 27.0 | 28.6 | 29.9 | 31.1 | 31.7 | 39.5 | 49.0 |
| 100 | 20.5 | 23.5 | 25.6 | 27.4 | 29.2 | 30.6 | 31.8 | 32.4 | 48.6 | 52.3 |

The Tables 2 and 3 show the distribution of the average PSNR values for QF_in =80, computed for the viewing cases 1 and 2 respectively over the large Training Set of input images 503 mentioned before. The Table 4 shows the average PSNR values for the viewing case 3, where the viewing conditions correspond to a maximum zoom of 90% of the size of the original picture.

The Tables 2, 3, and 4 can be used as the quality estimator in the improved transcoding systems described in the following.

In the viewing case 1 (Table 2), the scaled-up transcoded output image is compared to the original input image. Both the transcoder scaling factor zT and encoding quality factor QF_out affect the measured quality. However, differences between the original and the transcoded image due to blocking artifacts from a low encoding quality factor would be considered equivalent to the effects of scaling, if the PSNRs were equal. This seems paradoxical, since blocking artifacts are visually more annoying than the smoother low-resolution images. Therefore, the measure favors high-resolution, low-QF images over low-resolution high-QF images. The fact that the comparison does not account for the loss of perceived quality introduced by presenting a lower resolution image to the user somewhat compensates for this bias.

In the viewing case 2 (Table 3), the images are compared at the transcoded image resolution. The quality estimator is less affected by scaling than by the encoding quality factor, because both images are scaled down to the same resolution before the comparison, and scaling smooths defects. Moreover, because file size varies more with scaling than with changes in the encoding quality factor QF_out, smaller images with higher QF_out are favored over larger images with lower QF_out. This is reasonable if the transcoded image is to be viewed only at low resolution, otherwise the loss for the viewer is too great. The viewing case 3 (Table 4) is tailored to the user's viewing conditions, and thus would constitute a more accurate estimation of quality.

The quality prediction Table "N" 506, may be used advantageously in a simpler quality-aware transcoding system, that is simpler and more efficient than the Basic System 200.

Figure 7:
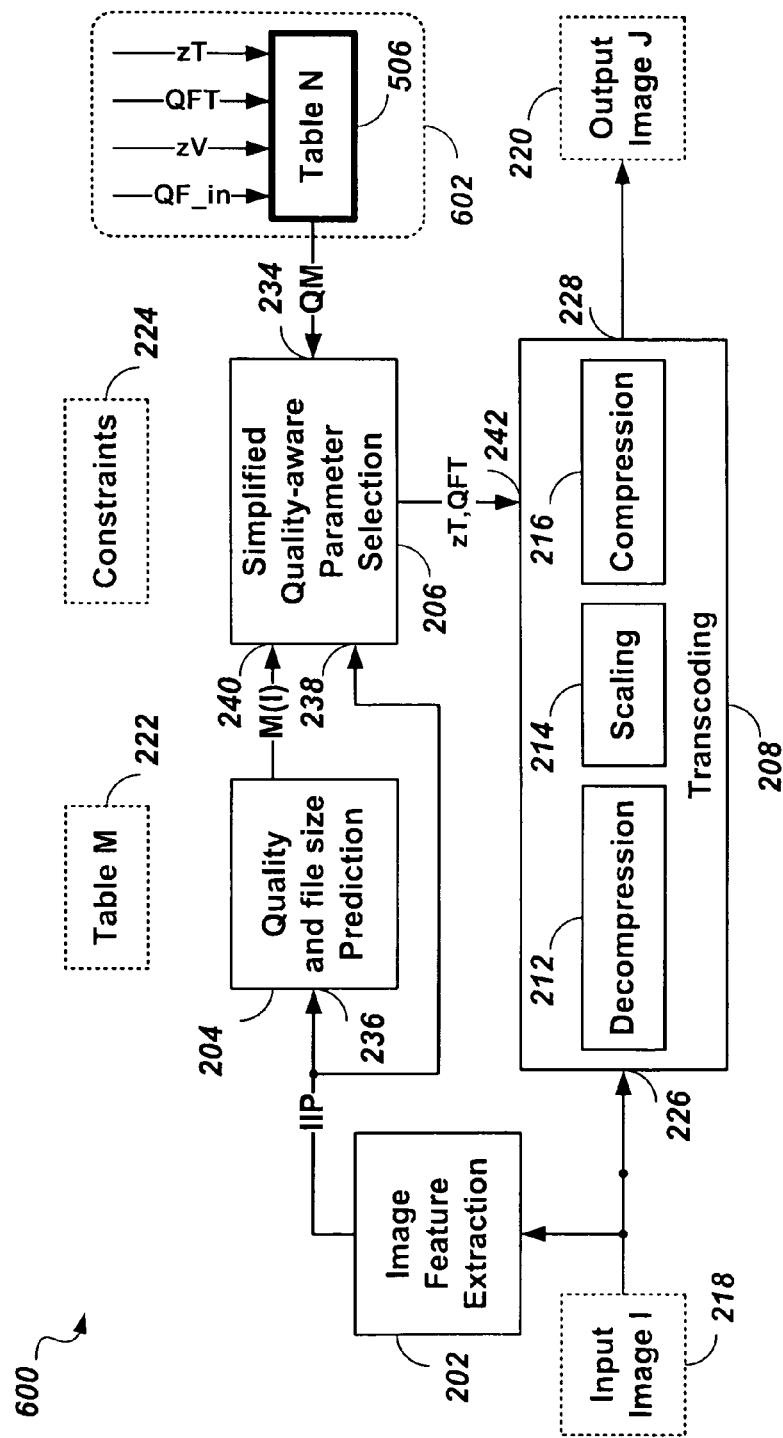
FIG. 7 shows a simple quality-aware image transcoding system (Simple System) 600.

FIG. 7 shows a simple quality-aware image transcoding system (Simple System) 600 comprises a computer, having a computer readable storage medium having computer executable instructions stored thereon, which when executed by the computer, provide the modules, which are similar to the Basic System 200, but in which the computationally expensive iterations to calculate the quality factor are replaced with a simple table look-up in the quality prediction Table "N" 506, which is stored in the computer readable medium.

The Simple System 600 comprises all the same modules of the Basic System 200 except the Basic Quality Determination Block 209 which includes the Quality Assessment module 210. These modules (202 to 208) remain unchanged bearing the same reference numerals as in FIG. 2, and having the same functions. In addition, the Simple System 600 comprises a Simple Quality Determination Block 602 which includes the Table N 506 from FIG. 6.

The computed quality measure QM is not generated by a Quality Assessment module in the Simple System 600 but is obtained directly from the quality prediction Table "N" 506. The quality prediction Table "N" 506 is the same table whose construction and generation was described in FIG. 6, and of which partial examples were described above in the Tables 2, 3, and 4. The quality prediction Table "N" 506 is addressed by four parameters: the input Quality Factor QF_in is obtained from the Image Feature Extraction module 202; the viewing scaling factor zV which may be set to 1 (viewing case 1) or another value as appropriate for the viewing condition; the transcoder quality factor QFT; and the transcoder scaling factor zT. QFT and zT are chosen by the Quality-aware Parameter Selection module 206 in a loop that seeks to maximize QM. This is described in more detail in the method description next.

Figure 8:
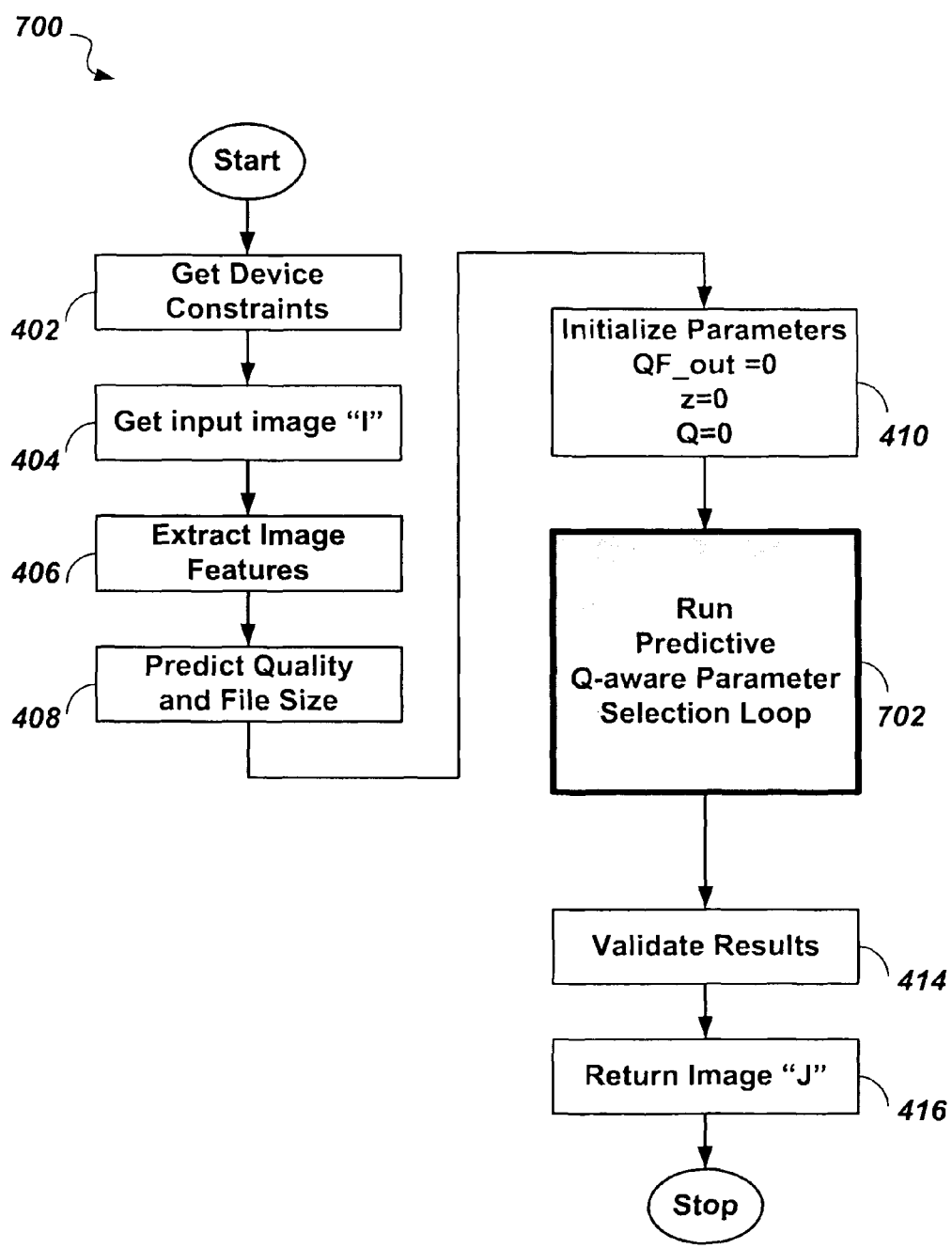
FIG. 8 is a flow chart of a predictive method 700 for quality-aware selection of parameters in JPEG image transcoding which is applicable to the Simple System 600.

FIG. 8 is a flow chart of a predictive method 700 for quality-aware selection of parameters in JPEG image transcoding which is applicable to the Simple System 600. The predictive method 700 includes many of the same sequential steps of the Basic method 400 of FIG. 4 bearing the same reference numerals:

step 402 "Get Device Constraints";
step 404 "Get Input Image I";
step 406 "Extract Image Features";
step 408 "Predict Quality and File Size";
step 410 "Initialize Parameters";
step 414 "Validate Result"; and
step 416 "Return Image J".

In place of the step 412 "Run Quality-aware Parameter Selection and Transcoding Loop" of FIG. 4, the predictive method 700 includes a new step (inserted after the step 410 "Initialize Parameters and before the step 414 "Validate Result"), step 702 "Run Predictive Q-aware Parameter Selection Loop".

Figure 9:
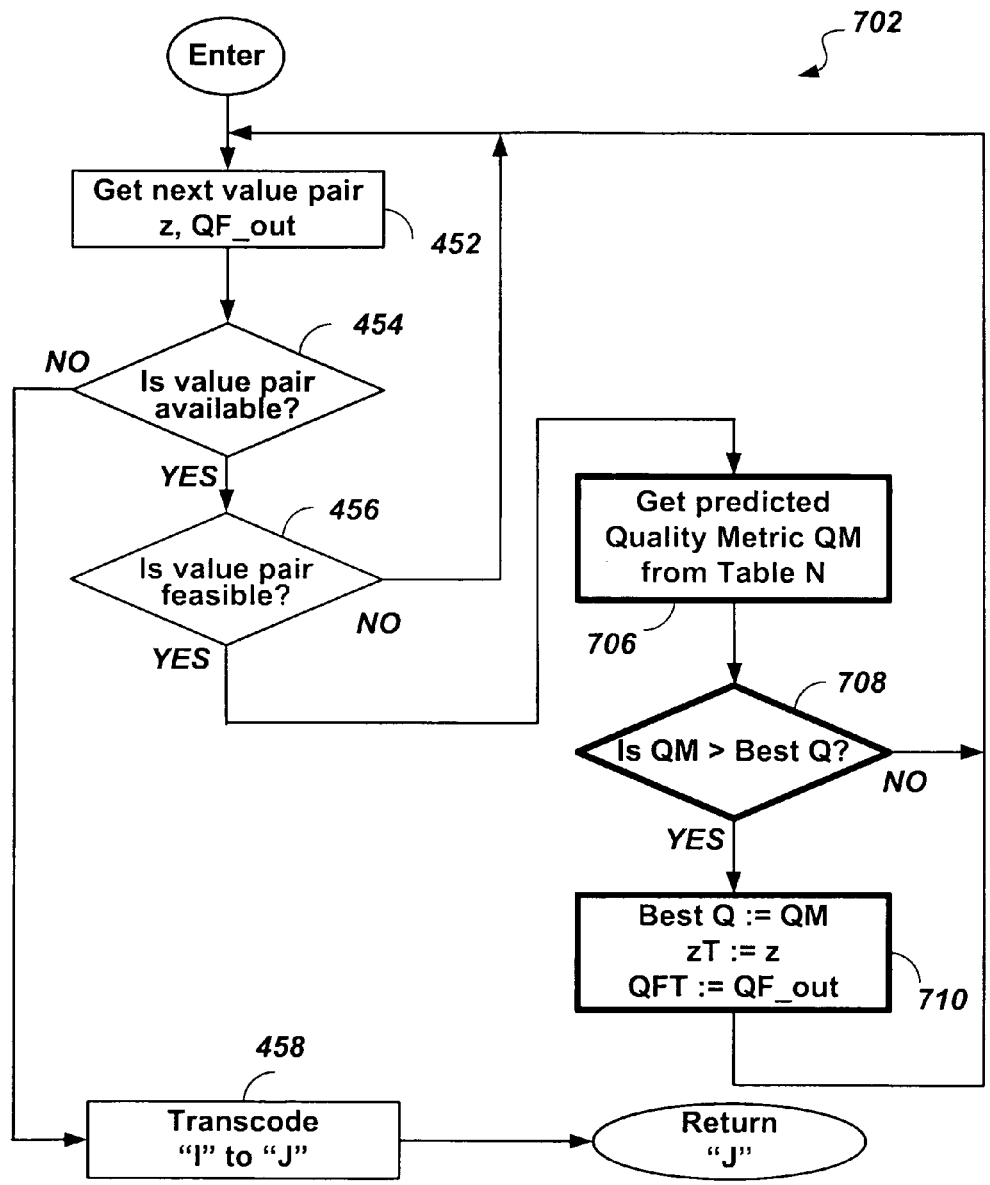
FIG. 9 is a flow chart showing an expansion of the step 702 "Run Predictive Quality-aware Parameter Selection Loop" of the Predictive Method 700.

FIG. 9 is a flow chart showing an expansion of the step 702 "Run Predictive Quality-aware Parameter Selection Loop" of the Predictive Method 700, including some of the same steps of the expanded step 412 "Run Quality-aware Parameter Selection and Transcoding Loop" of FIG. 5 bearing the same reference numerals and having the same functionality:

step 452 "Get Next Value Pair";
step 454* "Is Value Pair available?";
step 456* "Is Value Pair feasible?"; and
step 458 "Transcode I to J".

In addition, the expansion of the step 702 "Run Predictive Quality-aware Parameter Selection Loop" includes three new steps:

step 706 "Get predicted Quality Metric QM from Table N";
step 708 "Is QM>best Q?" and
step 710 "Set: Best Q :=QM, zT :=z, QFT :=QF_out".

*Note, the step sequence is modified from FIG. 5 to FIG. 9: The exit "NO" of the Step 454 goes to the step 458 (which is followed by the function return in which the transcoded output image "J" is returned) respectively. The exit "YES" of the Step 456 goes to the step 706.

In the step 706 "Get predicted Quality Metric QM from Table N" a precomputed quality metric value QM is retrieved from the Table "N" by indexing into the Table "N" with four parameters: the input Quality Factor QF(I) that was obtained in the step 406 "Extract Image Features" (FIG. 8); the viewing scaling factor zV that was chosen in the step 408 "Predict Quality and File Size"; the encoding quality factor QF_out; and the transcoder scaling factor z.

The step 706 "Get predicted Quality Metric QM from Table N" is followed by the step 708 "Is QM>best Q?".

In the step 708 "Is QM>best Q?" the quality metric QM obtained in the previous step is compared to the highest quality metric "Best Q" found so far. "Best Q" was initialized to zero in the prior step 410 "Initialize Parameters" (FIG. 8), and is updated each time a higher value is found, as indicated by the result of the comparison. If the result of the comparison is true (YES), execution continues with the next step 710 "Set: Best Q :=QM, zT :=z, QFT :=QF_out", otherwise execution loops back to the step 452 "Get Next Value Pair".

In the step 710 "Set: Best Q :=QM, zT :=z, QFT :=QF_out", the highest quality metric "Best Q" is updated to the value of QM that was found in the step 706 "Get predicted Quality Metric QM from the Table N". Further, the value pair ("z", QF_out) is recorded as a best transcoding parameter pair (zT, QFT) for the present image.

This completes the description of the expanded step 702 "Run Predictive Quality-aware Parameter Selection Loop" after which execution continues with the step 414 "Validate Result" (FIG. 8).

With the final step 416 "Return Image J" (FIG. 8), the basic method 400 for quality-aware selection of parameters in JPEG image transcoding ends by returning the transcoded output image "J" to the system, e.g. for storage as the output Image "J" 220.

The Simple System 600 with the predictive method 700 for quality-aware selection of parameters may thus be employed to provide a quality-aware transcoder, at a much lower processing cost than the Basic System 200 but without assurance that the actual best transcoding parameters have been found because of the imperfect nature of the predicted quality metric.

An improved quality-aware transcoding system may be constructed on the basis of the Basic System 200, enhanced with the Table "N". In this system, the search for the optimal quality may be considerably shortened with the use of the Table "N": instead of running the full loop contained in the step 412 "Run Quality-aware Parameter Selection and Transcoding Loop" (FIGS. 4 and 5) for all possible valid combinations of zT and QFT, one may avoid expensive processing steps in many iterations of the loop, by first consulting the Table "N".

In a simple variant of the step 412 "Run Quality-aware Parameter Selection and Transcoding Loop", one may skip transcoding step 458 "Transcode I to J", the step 460 "Is Actual Size OK?", and the "Quality Assessment Step" 474 (FIG. 5) if the predicted quality metric from the Table "N" would indicate that a higher quality than already found, is not likely obtained by the full analysis implied in these steps.

Figure 10:
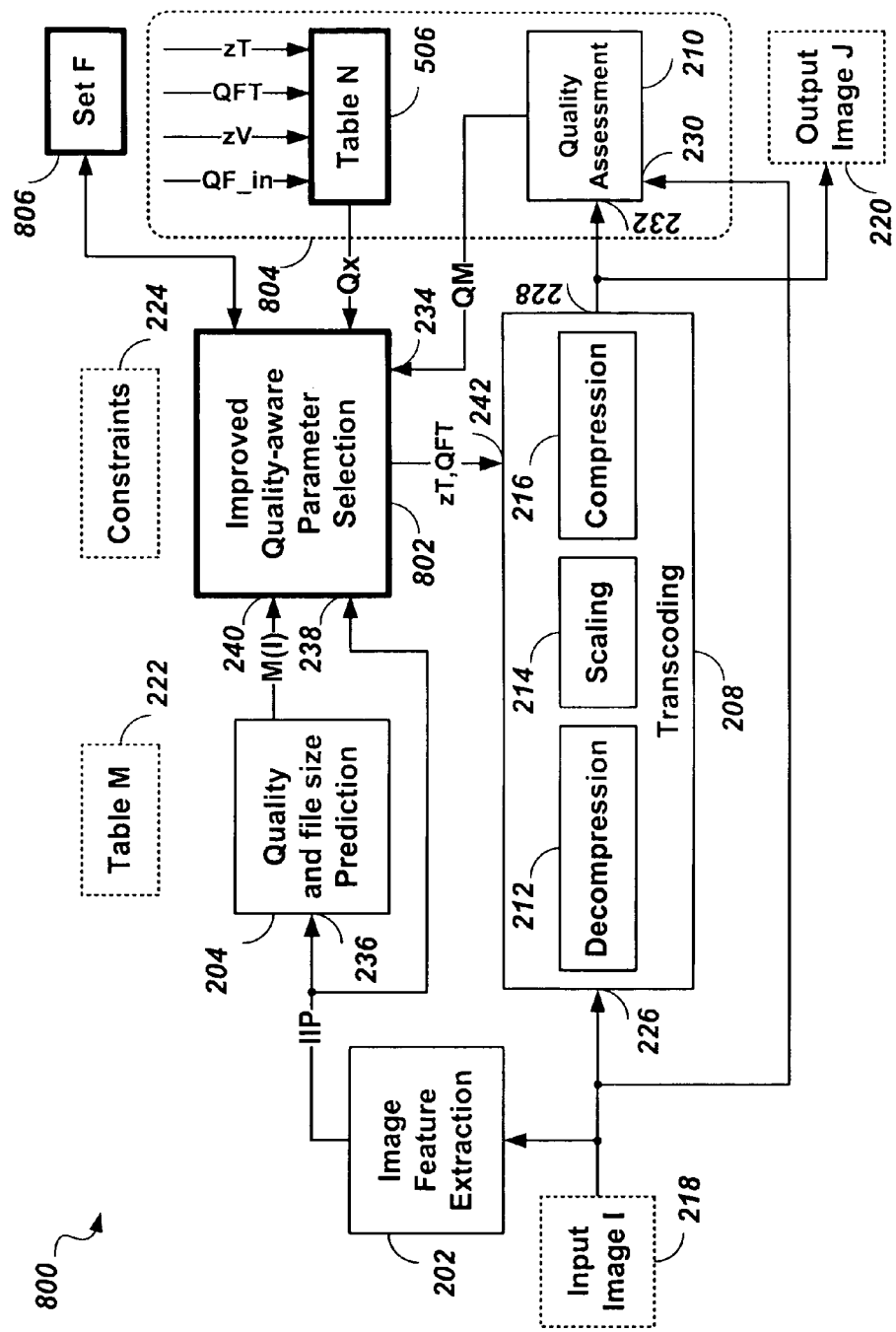
FIG. 10 shows a block diagram of an improved quality-aware transcoding system (Improved System) 800.

FIG. 10 shows a block diagram of an improved quality-aware transcoding system (Improved System) 800, comprising a computer, having a computer readable storage medium having computer executable instructions stored thereon, which when executed by the computer, provide respective modules of the Improved System 800. The Improved System 800 is derived from the Basic System 200, by the addition of the Table "N" 506 stored in the computer readable medium, and the replacement of the Quality-aware Parameter Selection module 206 with an Improved Quality-aware Parameter Selection module 802. The means for storing the Table "N" 506 and the Quality Assessment module 210 together form an improved Quality Determination Block 804.

The output of the Table "N" 506 provides a predicted Quality Metric Qx to the Improved Quality-aware Parameter Selection module 802. The quality prediction Table "N" 506 is addressed by the same four index parameters as in the Simple System 600: the input Quality Factor QF_in; the viewing scaling factor zV; the transcoder quality factor QFT; and the transcoder scaling factor zT. QFT and zT are chosen in the Improved Quality-aware Parameter Selection module 802 as shown in the method description in FIG. 11 which follows.

Briefly summarized, the functionality of the Improved Quality-aware Parameter Selection module 802 includes collecting a feasible set "F" 806 of value pairs of (zT,QFT) which are feasible, i.e. satisfy the input Image "I" and the device constraints. The set of value pairs may then be sorted according to the predicted Quality Metric Qx from the quality prediction Table "N" 506 indexed by the value pair. The actual Quality Metric QM is then computed with the help of the Quality Assessment Module 210 (as in the Basic System 200 of FIG. 2), but only for a promising subset of a limited number of value pairs of (zT,QFT) from the feasible set "F" 806 that predict a high predicted Quality Metric Qx.

Figure 11:
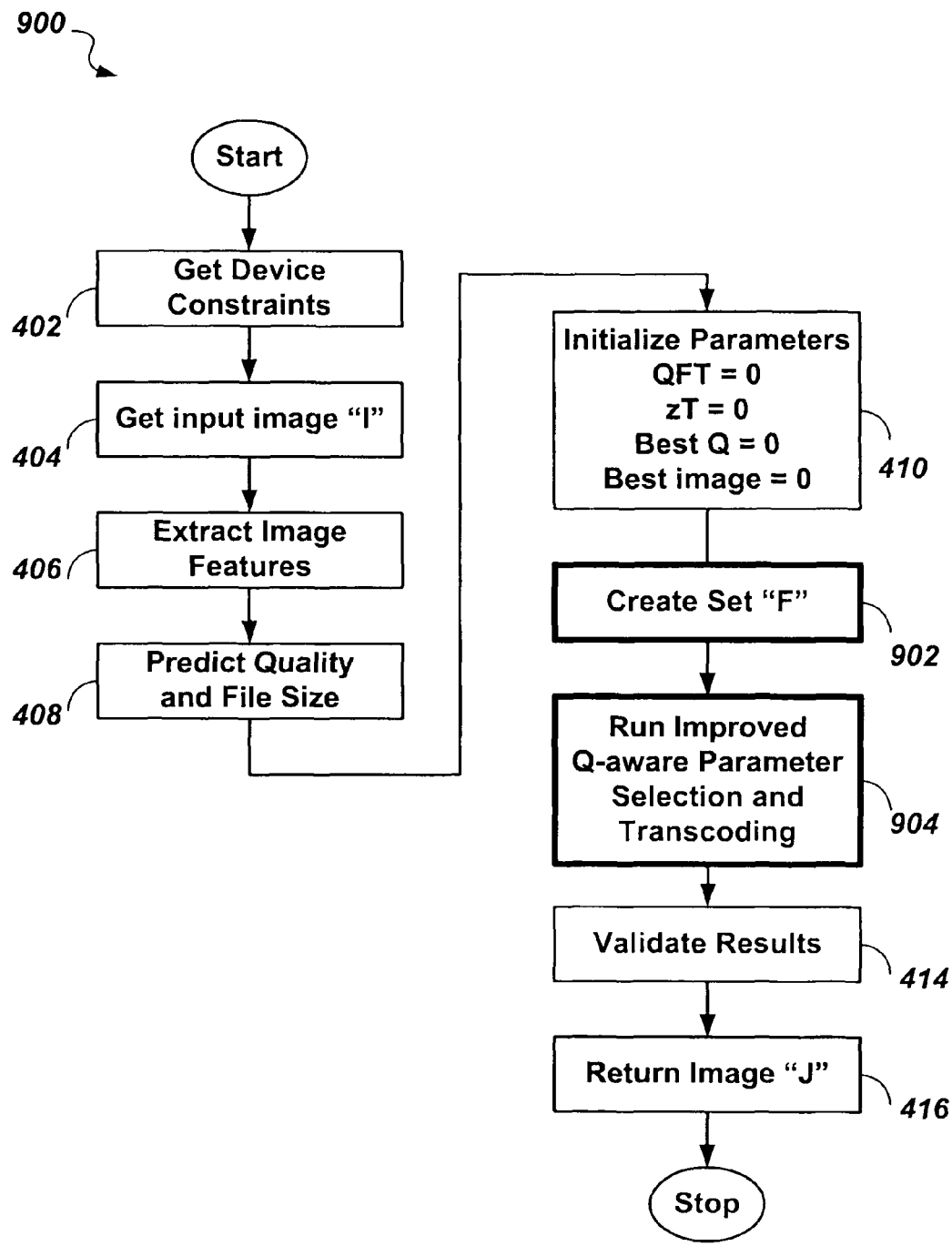
FIG. 11 is a flow chart of an improved method 900 for quality-aware selection of parameters in JPEG image transcoding which is applicable to the Improved System 800.

FIG. 11 is a flow chart of an improved method 900 for quality-aware selection of parameters in JPEG image transcoding which is applicable to the Improved System 800. The improved method 900 includes many of the same sequential steps of the Basic method 400 of FIG. 4 bearing the same reference numerals:

step 402 "Get Device Constraints";
step 404 "Get Input Image I";
step 406 "Extract Image Features";
step 408 "Predict Quality and File Size";
step 410 "Initialize Parameters";
step 414 "Validate Result"; and
step 416 "Return Image J".

In place of the step 412 "Run Quality-aware Parameter Selection and Transcoding Loop" of FIG. 4, the improved method 900 includes two new steps (inserted between the after the step 410 "Initialize Parameters and before the step 414 "Validate Result"):

step 902 "Create Set "F"";
step 904 "Run Improved Q-aware Parameter Selection and Transcoding".

Figure 12:
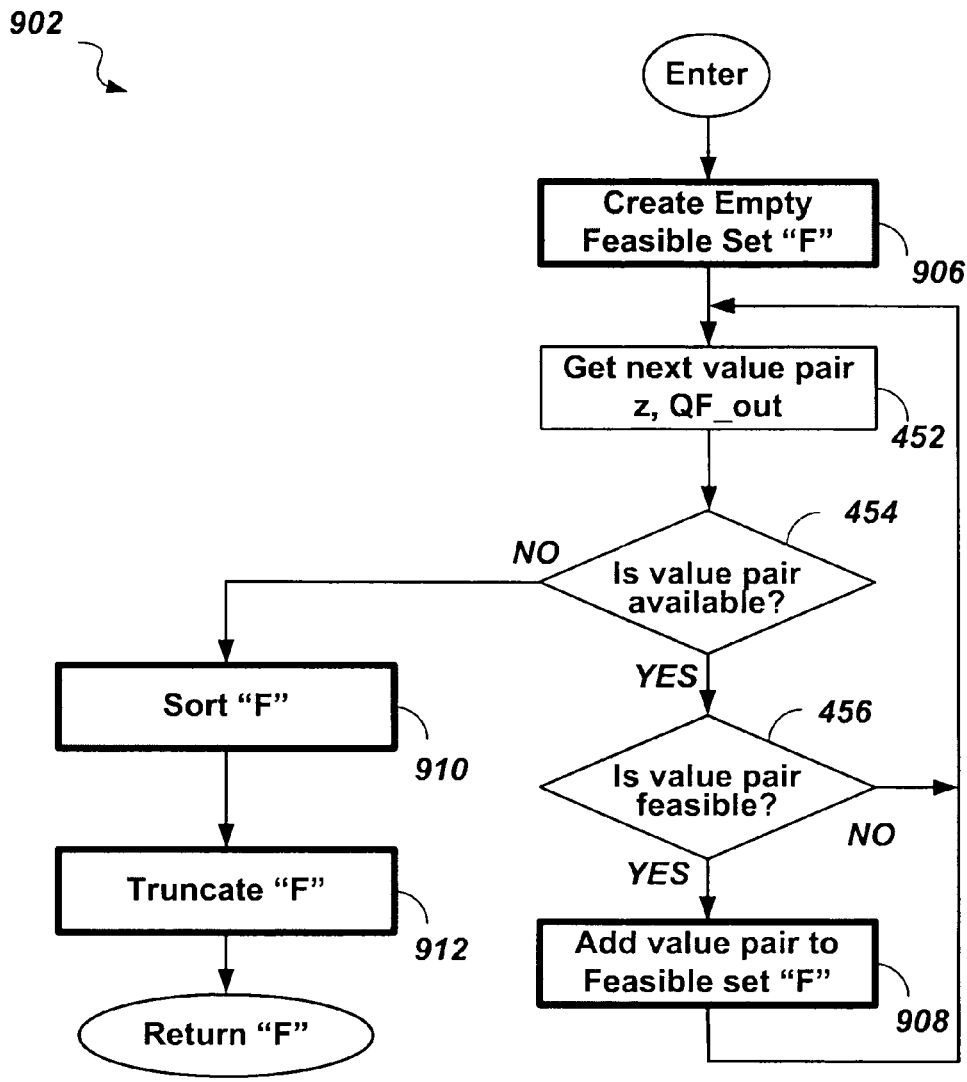
FIG. 12 is a flow chart showing an expansion of the step 902 "Create Set "F"" of the improved method 900.

FIG. 12 is a flow chart showing an expansion of the step 902 "Create Set "F" of the improved method 900, including three of the same steps of the expanded step 412 "Run Quality-aware Parameter Selection and Transcoding Loop" of FIG. 5 bearing the same reference numerals and having the same functionality:

step 452 "Get Next Value Pair";
step 454* "Is Value Pair available?"; and
step 456* "Is Value Pair feasible?".

The expanded step 902 "Create Set "F"" further includes new steps:
step 906 "Create Empty Feasible Set F";
step 908 "Add value pair to Feasible Set F";
step 910 "Sort F"; and
step 912 "Truncate F".

*Note, the step sequence is modified from FIG. 5 to FIG. 12: The exit "NO" of the Step 454 goes to the function return (in which the Feasible Set "F" is returned), and the exit "YES" of the Step 456 goes to the step 908.

The steps 452, 454, 456, and 908 form a loop, preceded by the initializing step 906.

In the 906 "Create Empty Feasible Set F" the Feasible Set "F" 806 is created empty. The following steps (452 to 456, 908) form a loop in which a number of distinct value pairs are generated (step 452), checked for availability (step 454) and feasibility (step 456), and added into the Feasible Set "F" 806 (step 908). If a generated value pair is not feasible (exit "NO" from the step 456), the loop is re-entered from the top. If no more distinct value pairs are available (exit "NO" from the step 454), the loop is exited and the Feasible Set "F" 806 is sorted in the step 910 "Sort F" according to the predicted Quality Metric Qx from the quality prediction Table "N" 506 indexed by the distinct value pair. The Feasible Set "F" 806 now contains all feasible value pairs in descending order according to the predicted quality.

In the next step, the step 912 "Truncate F", the Feasible Set "F" 806 is truncated at the bottom by removing value pairs which are associated with lower predicted quality, until only a definable number C_max of value pairs is left to remain in the Feasible Set "F" 806.

Figure 13:
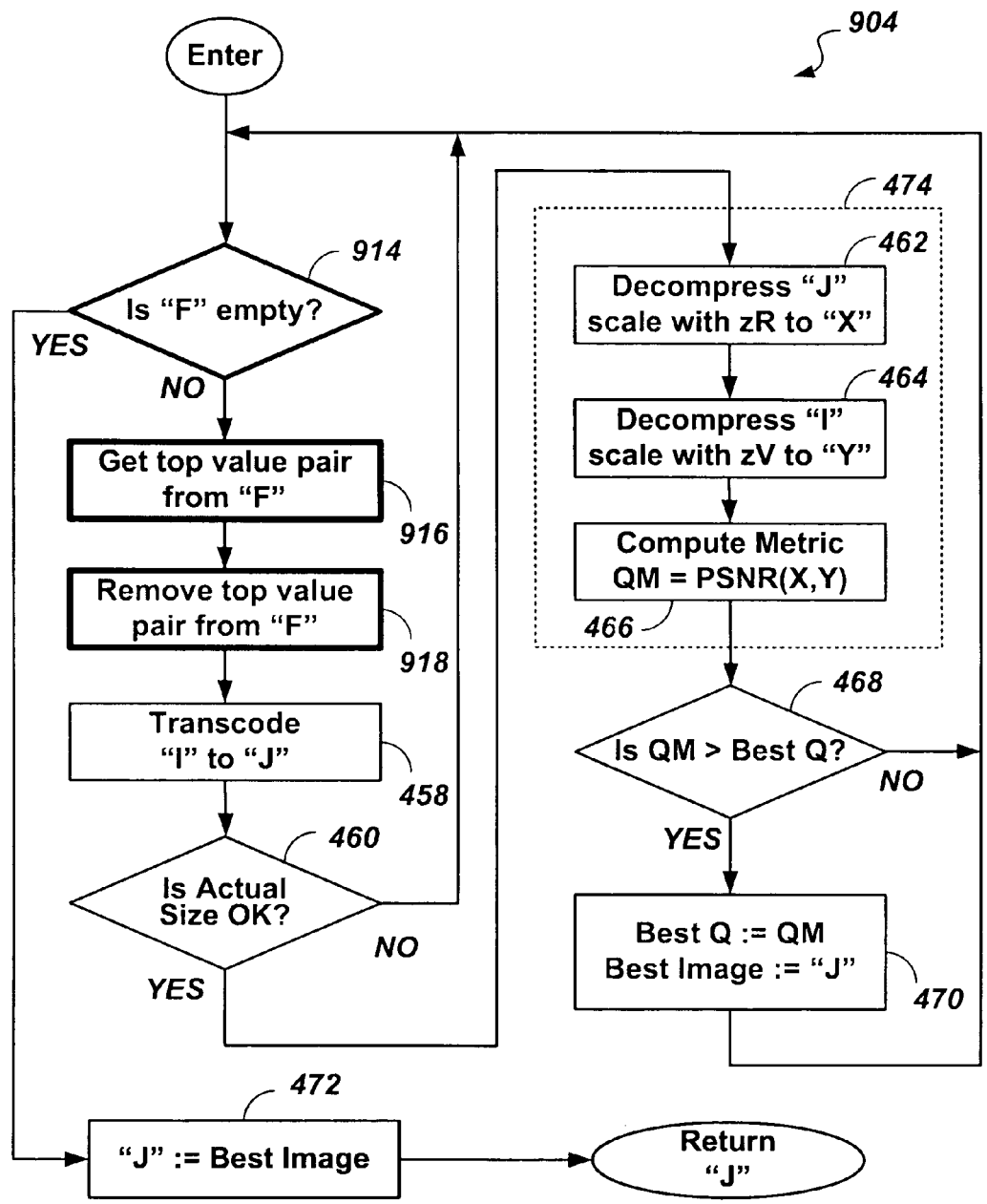
FIG. 13 is a flow chart showing an expansion of the step 904 "Run Improved Q-aware Parameter Selection and Transcoding" of the improved method 900.

FIG. 13 is a flow chart showing an expansion of the step 904 "Run Improved Q-aware Parameter Selection and Transcoding" of the improved method 900, including some of the same steps of the expanded step 412 "Run Quality-aware Parameter Selection and Transcoding Loop" of FIG. 5 bearing the same reference numerals and having the same functionality:
step 458 "Transcode I to J";
step 460 "Is Actual Size OK?"
step 462 "Decompress J and scale with zR to X";
step 464 "Decompress I and scale with zV to Y";
step 466 "Compute Metric QM=PSNR(X,Y)";
step 468 "Is QM>Best Q?";
step 470 "Set Best Q :=QM, Best Image :=J"; and
step 472 "Set J :=Best Image".

The expanded step 904 "Run Improved Q-aware Parameter Selection and Transcoding" further includes new steps:
step 914 "Is F Empty?";
step 916 "Get top value pair from F"; and
step 918 "Remove top value pair from F".

The expanded step 904 "Run Improved Q-aware Parameter Selection and Transcoding" forms a loop analogous to the loop of the Basic System 200, for finding the best Image, that is the image with the best quality assessed through the Quality Assessment step 474 (the sequence of the steps 462 to 466). Instead of running the loop for all feasible value pairs (as in the Basic Method 400), the loop of the Improved Method 900 is confined to the value pairs in the Feasible Set "F" 806. It will be appreciated that the steps 910 "Sort F" and 912 "Truncate F" provide the mechanism by which the number of value pairs to be transcoded and quality assessed can be limited to those pairs which have a predicted quality measure that is high.

The loop is entered at the step 914 "Is F Empty?".

In the step 914 "Is F Empty?" the Feasible Set "F" 806 is inspected. If it is empty (exit "YES" from the step 914) the loop is exited, execution jumps to the step 472 "Set J :=Best Image", and the expanded step 904 "Run Improved Q-aware Parameter Selection and Transcoding" is exited (return "J").

In the step 916 "Get top value pair from F" the value pair corresponding to the highest predicted quality metric (the "top value pair") is copied from the Feasible Set "F" 806 to the transcoder value pair (zT,QFT).

In the step 918 "Remove top value pair from F", the "top value pair" is removed from the Feasible Set "F" 806, and execution goes to the next step 458 "Transcode I to J".

Similar to the Basic Method 400, the subsequent steps assess the quality metric, save the best quality metric and the best image, and jump back to the start of the loop (at the step 914).

The effect of sorting and truncating the Feasible Set "F" 806 in FIG. 12 can be seen as follows: If the Feasible Set "F" 806 is not truncated, only sorted, all value pairs will be evaluated (transcoded and the quality assessed), merely in the order of predicted quality. This would result in the same best image to be found as with the Basic Method 200, without gain in processing cost.

Truncating the Feasible Set "F" 806 leaves the number C_max value pairs in the set. Because the set is sorted first, these C_max value pairs will be the value pairs that are predicted to yield the most promising quality metrics. Thus, compared with the basic method, fewer value pairs will be fully evaluated, saving the processing that would have been (in the Basic System 200) expended to evaluate value pairs that yield a lower quality.

If C_max is set to one (1), only one value pair will be fully evaluated, but regardless of actual quality assessed, the resulting best image would be the same as that found with the Predictive Method 700 of the Simple System 600.

Thus, C_max should be set to a value higher than one, because the highest predicted quality is not necessarily the actual highest quality. Setting C_max to a value of five (5) has been found to give good results, and is very likely to include the actual best value pair. Alternatively, we could set a quality threshold. When the predicted quality metric is smaller by a given margin (e.g. 3 dB) than the best predicted quality metric obtained so far then we may stop. In a further modification, sorting of the set "F" may be done as follows:

1) For each feasible scaling value "z", find the value pair in the feasible set "F" with the best predicted quality value. Let's suppose there are P such value pairs. (i.e. we find the best value pair for z=10%, then for 20%, etc.)
2) Sort the P value pairs obtained in step 1 from the highest to the lowest predicted quality value. These will be the inserted at the beginning of the feasible set "F".
3) Then sort the remaining value pairs obtained from highest to lowest predicted quality value. These will be the inserted in the feasible set "F" after the previous P value pairs.

Proceed as before with a C_max>=P.

Figure 14A:
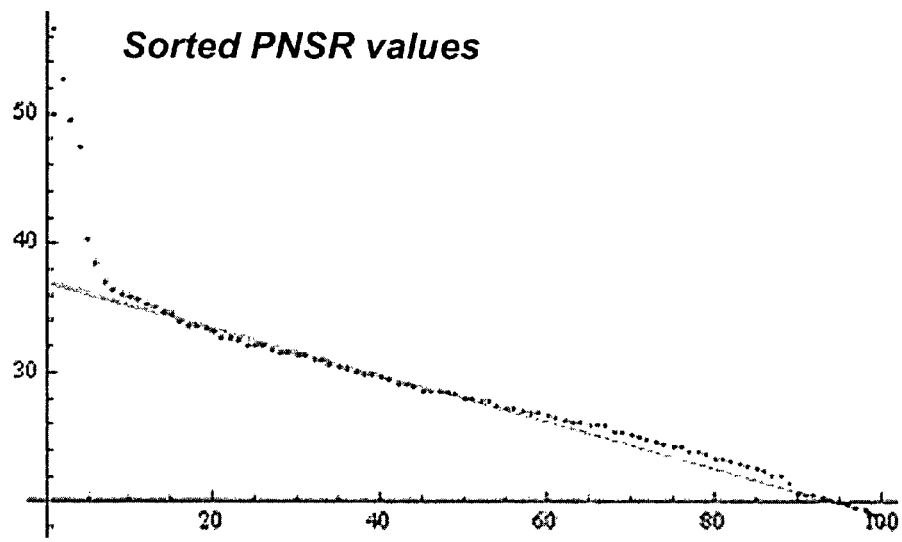
FIGS. 14A and 14B show an example of sorted PSNR values for zV=0.7 and s_max=1.0; and an example of sorted PSNR values with zV=0.7 with s_max=0.7 respectively.
Figure 14B:
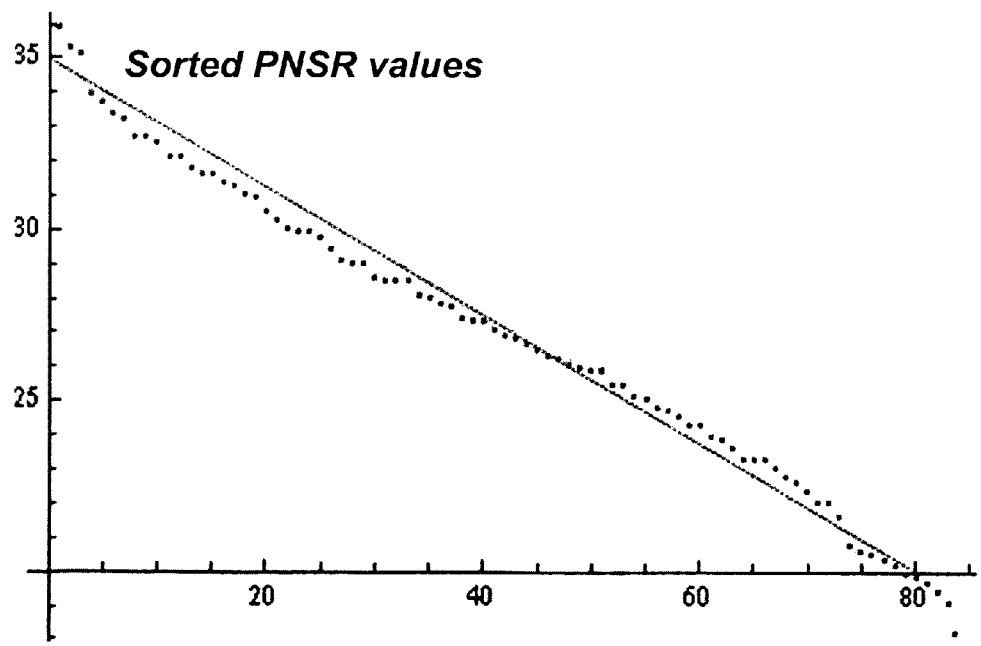

The charts shown in FIGS. 14A and 14B show graphical representations of quality metric values (PSNR) recorded in the feasible set "F", after sorting. FIG. 14A shows an example of sorted PSNR values for zV=0.7, while FIG. 14B shows an example of sorted PSNR values with zV=0.7 with s_max=0.7, with the same image as FIG. 14A.

FIG. 15 is a flow chart of a quality prediction table generation method 1000, illustrating the functionality of the quality prediction table generation system 500 (FIG. 6). The quality prediction table generation method 1000 includes some of the same steps of the Basic Method 400 of FIGS. 4 and 5 bearing the same reference numerals and having the same functionality, namely the steps 406, 458, and 474. The quality prediction table generation method 1000 includes the following steps:

step 1002 "Initialize N(QF_in,zV)";
step 1004 "Are more images with QF(I)=QF_in available?";
step 1006 "Get Next Image "I";
step 406 "Extract Image Features";
step 1008 "Set up parameters for loop over value pairs (z,QF_out)";
step 1010 "Get first value pair (z,QF_out)";
step 458 "Transcode I to J";
step 474 "Quality Assessment Step";
step 1012 "Update N(QF_in,zV)";
step 1014 "Are more value pairs (z,QF_out) available?"; and
step 1016 "Get next value pair (z,QF_out)".

As described earlier, the quality prediction Table "N" 506 (FIG. 6) is a four-dimensional table and contains a Quality Metric Q indexed by four index variables: the encoding quality factor QF_in of an input image from the Training Set of Input Images 502, the viewing scaling factor zV, the encoding quality factor QF_out to be used in compressing the output image in the transcoder, and the scaling factor "z" to be used in compressing the output image in the transcoder. Shown in FIG. 15 is the quality prediction table generation method 1000, limited to generating a sub-table of the quality prediction table "N", namely N(QF_in,zV), that is the sub table for one value of the input encoding quality factor QF_in and one value of the viewing scaling factor zV. The entire quality prediction table "N" for additional values of QF_in and zV, may be generated by repeating the steps of the quality prediction table generation method 1000 for these additional values of QF_in and zV.

In the step 1002 "Initialize N(QF_in,zV)", the sub table N(QF_in,zV) is cleared to zero.

In the step 1004 "Are more images with QF(I)=QF_in available?" it is determined if any more images having an input encoding quality factor QF(I)=QF_in are available in the Image Training Set 502 (FIG. 6). If no more such images are available (i.e. all such images have already been processed), the result of the determination is "NO", and the quality prediction table generation method 1000 exits with the populated sub-table N(QF_in,zV), otherwise execution continues with the step 1006 "Get Next Image "I".

In the step 1006 "Get Next Image "I", the next image is obtained from the Image Training Set 502, to become the input Image "I".

In the step 406 "Extract Image Features" features of the input Image "I" such as width and height are determined, as described earlier (FIG. 4).

In the step 1008 "Set up parameters for loop over value pairs (z,QF_out)" a per-image loop 1018 over value pairs (z,QF_out) is prepared, that is the per-image loop 1018 comprising the steps 1010, 458, 474, 1012, 1014, and 1016. The per-image loop 1018 is run for each combination of the scaling factor "z" from the set {K, 2*K, 3*K, . . . , 100%} and the output Quality Factor QF_out from the set {L, 2*L, 3*L, . . . , 100}, where the increments "K" and "L" may be selected as K=10% and L=10, for example. The Tables 2 to 4 above were calculated with these values. The combination of "z" and QF_out is referred to as a value pair (z,QF_out).

In the step 1010 "Get first value pair (z,QF_out)", the first value pair (z,QF_out) is determined, for example (z=10%, QF_out=10).

In the step 458 "Transcode I to J", the input Image "I" is transcoded into the output Image "J" with the transcoding parameters zT="z", and QFT=QF_out, as described earlier (FIG. 5).

In the step 474 "Quality Assessment Step" the quality Metric QM of the transcoding is determined as described earlier (FIG. 5).

In the step 1012 "Update N(QF_in,zV)" the sub-table N(QF_in,zV) is updated with the quality metric, at the table location indexed by the value pair (z,QF_out), more precisely the predicted quality metric at that table location is updated with the simple average of the quality metric values from all images at the same table location.

In the step 1014 "Are more value pairs (z,QF_out) available?" it is determined if any more combinations of the scaling factor "z" and the output Quality Factor QF_out are available. If no more distinct value pairs (z,QF_out) are available (i.e. all combinations have already been processed), the result of the determination is "NO", and the per-image loop 1018 exits to the step 1004 "Are more images with QF(I)=QF_in available?" to find and start processing the next image from the Image Training Set 502, otherwise ("YES") execution of the per-image loop 1018 continues with the step 1016 "Get next value pair (z,QF_out)".

In the step 1016 "Get next value pair (z,QF_out)" the next value pair (z,QF_out) is determined.

As indicated earlier, the Image Training Set 502 may include many images that may generate slightly different actual values of the best quality metric for the same value pair index. In the quality prediction table generation method 1000 described here, the computed quality metrics are used to update the quality prediction table "N" 506 directly in a manner not further specified. Preferably, the raw data generated by the quality prediction table generation method 1000 are collected and processed in a manner similar to that described in the "Kingston" paper by Steven Pigeon et al, mentioned above. In this way, by grouping and quantizing the data, and further statistical processing, optimal LMS (least mean squares) estimators of the quality metrics may be computed and stored in the quality prediction Table "N" 506.

The systems and methods of the embodiments of the present invention provide for improvements in transcoding in a way that takes scaling, compressed file size limitations, as well as image quality into account. It is understood that while the embodiments of the invention are described with reference to JPEG encoded images, its principles are also applicable to the transcoding of digital images encoded with other formats, for example GIF (Graphics Interchange Format) and PNG (Portable Network Graphics) when they are used in a lossy compression mode. The systems of the embodiments of the invention can include a general purpose or specialized computer having a CPU and a computer readable medium, e.g., memory, or alternatively, the systems can be implemented in firmware, or combination of firmware and a specialized computer. In the embodiments of the invention, the quality prediction table is a four-dimensional table which is indexed by 4 parameters. It is understood that the quality prediction table can be generally a multi-dimensional table, which is indexed by any required number of parameters, whose number is higher or lower than four. The computer readable medium, storing instructions thereon for performing the steps of the methods of the embodiments of the invention, may comprise computer memory, DVD, CD-ROM, floppy or the like.

Although the embodiments of the invention has been described in detail, it will be apparent to one skilled in the art that variations and modifications to the embodiment may be made within the scope of the following claims.

What is claimed is:

1. A method for selecting transcoding parameters and transcoding an input image into an output image for a terminal having terminal constraints including a maximum device file size, the method comprising:
   (a) determining a file size, and an encoding quality factor QF(I) of the input image;
   (b) providing an array of relative file size prediction values and predicted quality metric values characterizing a measure of distortion of an image introduced by transcoding, the array being indexed by encoding quality factor QF(I), output encoding quality factor QFT and a resolution scaling factor zT;
   (c) computing a maximum relative file size as the maximum device file size divided by the file size of the input image;
   (d) selecting, from the array, a set of feasible transcoding parameters, yielding those predicted relative file size values not exceeding the maximum relative file size, which correspond to the file size and the encoding quality factor QF(I) of the input image;
   (e) obtaining, from the array, predicted quality metric values corresponding to the set of feasible transcoding parameters; and
   (f) selecting those transcoding parameters from the set of feasible transcoding parameters, which yield the highest predicted quality metric value.

2. The method of claim 1, further comprising transcoding the input image into the output image using the selected transcoding parameters corresponding to the highest predicted quality metric.

3. The method of claim 1, wherein the array has been obtained from transcoding of a set of training images.

4. The method of claim 1, wherein the set of feasible transcoding parameters comprises the resolution scaling factor zT not exceeding a maximum scaling factor z_max determined using predetermined maximum image dimensions of the output image and image dimensions of the input image.

5. The method of claim 1, wherein the step (d) comprises interpolating between entries of the data structure for at least one of the indices.

6. The method of claim 1, the step (d) further comprising limiting the set of feasible transcoding parameters to those combinations of the output encoding quality factor QFT and the resolution scaling factor zT yielding predicted relative file size values not exceeding the maximum relative file size.

7. The method of claim 1, wherein the array comprises a multi-dimensional relative file size prediction table indexed by the QF(I), QFT and zT.

8. The method of claim 1, wherein the array comprises a multi-dimensional quality prediction table indexed by the QF(I), QFT and zT.

9. The method of claim 1, wherein the input image and the output image are JPEG images.

10. The method of claim 1, wherein the quality metric values are based on the Maximum Difference (MD) measure of respective transcoded training images compared with corresponding training images in the set of training images.

11. The method of claim 1, the step (e) further comprising:
   sorting the set of feasible transcoding parameters according to the corresponding predicted quality metric values; and
   truncating the set of feasible transcoding parameters by reducing it to a promising subset corresponding to high predicted quality metric values.

12. The method of claim 3, wherein the set of training images comprises a first set of training images and a second set of training images, the method further comprising:
   obtaining the predicted relative file size values from transcoding of the first set of training images; and
   obtaining the predicted quality metric values from transcoding of the second set of training images.

13. The method of claim 3, wherein the quality metric values are determined based on the Peak Signal to Noise Ratio (PSNR) measure of respective transcoded training images compared with corresponding training images in the set of training images.

14. The method of claim 6, the step (d) further comprising limiting the set of feasible transcoding parameters to those combinations of zT and QFT wherein the resolution scaling factor zT does not exceed a maximum scaling factor z_max determined from predetermined maximum image dimensions of the output image and image dimensions of the input image.

15. The method of claim 14, wherein the maximum scaling factor z_max is further defined according to a viewing scaling factor zV chosen based on anticipated viewing conditions of the output image.

16. A system for selecting transcoding parameters and transcoding an input image into an output image for a terminal having terminal constraints including a maximum device file size, the system comprising:
   a processor; and
   a computer readable storage medium having computer readable instructions stored thereon for execution for the processor, forming:
      an image feature extraction module, determining a file size, and an encoding quality factor QF(I) of the input image;
      an array of relative file size prediction values and predicted quality metric values characterizing a measure of distortion of an image introduced by transcoding, the array being indexed by encoding quality factor QF(I), output encoding quality factor QFT and a resolution scaling factor zT;
      a quality and file size prediction module being configured to:
         compute a maximum relative file size as the maximum device file size divided by the file size of the input image;
         select from the array, a set of feasible transcoding parameters, yielding those predicted relative file size values not exceeding the maximum relative file size, which correspond to the file size and the encoding quality factor QF(I) of the input image; and
         obtain, from the array, predicted quality metric values corresponding to the set of feasible transcoding parameters;
      and
      a quality-aware parameter selection module, selecting those transcoding parameters from the set of feasible transcoding parameters, which yield the highest predicted quality metric value.

17. The system of claim 16, further comprising a transcoding module for transcoding the input image into the output image using the selected transcoding parameters corresponding to the highest predicted quality metric.

18. The system of claim 16, wherein the array has been obtained from transcoding of a set of training images.

19. The system of claim 16, wherein the set of feasible transcoding parameters comprises the resolution scaling factor zT not exceeding a maximum scaling factor z_max determined from predetermined maximum image dimensions of the output image and image dimensions of the input image.

20. The system of claim 16, wherein the quality and file size prediction module is further configured to interpolate between entries of the array for at least one of the indices.

21. The system of claim 16, wherein the quality and file size prediction module is further configured to limit the set of feasible transcoding parameters to those combinations of the output encoding quality factor QFT and the resolution scaling factor zT yielding predicted relative file size values not exceeding the maximum relative file size.

22. The system of claim 16, wherein the array comprises a multi-dimensional relative file size prediction table indexed by the QF(I), QFT and zT.

23. The system of claim 16, wherein the array comprises a multi-dimensional quality prediction table indexed by the QF(I), QFT and zT.

24. The system of claim 16, wherein the input image and the output image are JPEG images.

25. The system of claim 18, wherein the quality metric values are determined based on the Peak Signal to Noise Ratio (PSNR) measure of respective transcoded training images compared with corresponding training images in the set of training images.

26. The system of claim 18, wherein:
the set of training images comprises a first set of training images and a second set of training images;
the predicted relative file size values are obtained from transcoding of the first set of training images; and
the predicted quality metric values are obtained from transcoding of the second set of training images.

27. The system of claim 18, wherein the quality metric values are based on the Maximum Difference (MD) measure of respective transcoded training images compared with corresponding training images in the set of training images.

28. The system of claim 16, wherein the quality-aware parameter selection module is further configured to sort the set of feasible transcoding parameters according to the corresponding predicted quality metric values, and truncate the set of feasible transcoding parameters by reducing the set to a promising subset corresponding to high predicted quality metric values.

29. The system of claim 21, the quality and file size prediction module is further configured to limit the set of feasible transcoding parameters to those combinations of zT and QFT wherein the resolution scaling factor zT does not exceed a maximum scaling factor z_max determined from predetermined maximum image dimensions of the output image and image dimensions of the input image.

30. The system of claim 29, wherein the maximum scaling factor z_max is further defined according to a viewing scaling factor zV chosen based on anticipated viewing conditions of the output image.

* * * * *